United States Patent
Mishra et al.

(10) Patent No.: US 11,520,729 B2
(45) Date of Patent: Dec. 6, 2022

(54) I2C BUS ARCHITECTURE USING SHARED CLOCK AND DEDICATED DATA LINES

(71) Applicant: QUALCOMM Incorporated, San Diego, CA (US)

(72) Inventors: Lalan Jee Mishra, San Diego, CA (US); Radu Pitigoi-Aron, San Jose, CA (US); Sharon Graif, Zichron Yaakov (IL); Lior Amarilio, Yokneam (IL); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/307,842

(22) Filed: May 4, 2021

(65) Prior Publication Data

US 2022/0358079 A1    Nov. 10, 2022

(51) Int. Cl.
  *G06F 13/42*    (2006.01)
  *G06F 1/08*    (2006.01)
  *G06F 13/20*    (2006.01)

(52) U.S. Cl.
  CPC ............ *G06F 13/4291* (2013.01); *G06F 1/08* (2013.01); *G06F 13/20* (2013.01)

(58) Field of Classification Search
  CPC ................. G06F 1/10; G06F 1/12; G06F 1/14
  See application file for complete search history.

(56) References Cited

U.S. PATENT DOCUMENTS

| | | | |
|---|---|---|---|
| 9,496,879 B1 | 11/2016 | Duan et al. | |
| 2005/0273544 A1 | 12/2005 | Fitzsimmons et al. | |
| 2012/0051373 A1 | 3/2012 | Shirlen et al. | |
| 2013/0046909 A1 | 2/2013 | Huang | |
| 2016/0363954 A1 | 12/2016 | Ng et al. | |
| 2017/0118039 A1* | 4/2017 | Wiley | H04L 12/40039 |
| 2018/0069535 A1* | 3/2018 | Song | H03K 3/017 |
| 2020/0195884 A1* | 6/2020 | Yoshimochi | H04N 7/12 |
| 2020/0201804 A1* | 6/2020 | Graif | G06F 13/4031 |
| 2020/0301466 A1* | 9/2020 | Kashiwagi | G06F 1/08 |

OTHER PUBLICATIONS

International Search Report and Written Opinion—PCT/US2022/021977—ISA/EPO—dated Jul. 25, 2022.

* cited by examiner

*Primary Examiner* — Getente A Yimer
(74) *Attorney, Agent, or Firm* — Qualcomm Incorporated

(57) ABSTRACT

Systems, methods, apparatus and techniques are described that provide point-to-point capabilities without the expected increase in input/output pad usage. In some examples, point-to-point data lines are provided between a host and multiple slave devices and timing of communication is controlled using a clock signal shared by the multiple slave devices. An apparatus has a plurality of bus master circuits configured to control point-to-point communication with corresponding slave devices and a clock generation circuit configured to provide pulses in a serial bus clock signal when one or more bus master circuits are in an active state, and further to idle the serial bus clock signal when all bus master circuits are idle. Each bus master circuit may be configured to communicate with its corresponding slave device in accordance with the timing provided by the serial bus clock signal that is transmitted over a common clock line to each slave device.

30 Claims, 19 Drawing Sheets

＃ I2C BUS ARCHITECTURE USING SHARED CLOCK AND DEDICATED DATA LINES

TECHNICAL FIELD

The present disclosure relates generally to an interface between processing circuits and peripheral devices and more particularly, to optimizing pin counts when multiple serial buses are operated in a point-to-point configuration.

BACKGROUND

Mobile communication devices may include a variety of components including circuit boards, integrated circuit (IC) devices and/or System-on-Chip (SoC) devices. These components can include processing circuits, user interface components, storage and other peripheral components that communicate through a serial bus. Many protocols used to operate a serial bus define specific roles and functions for the devices that are coupled through the serial bus. A device frequently referred to as a bus master or bus master device is configured to control timing of transmissions and to provide control signaling used to manage other devices coupled to the serial device. The other devices are frequently referred to as slave devices and are configured to respond to control signaling provided by the bus master device and to transmit or receive data in accordance with timing defined by the bus master device. Bus master devices may be referred to using alternative terms such as "bus controller," "bus host," "bus manager" or the like. Slave devices may be referred to using alternative terms such as "peripheral device," "subordinate device," "target device" or the like.

The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multidrop bus. A two-wire I2C bus includes a Serial Data Line (SDA) that carries a data signal, and a Serial Clock Line (SCL) that carries a clock signal.

In another example, Improved Inter-Integrated Circuit (I3C) protocols may be used to control operations on a serial bus. I3C protocols are defined by the Mobile Industry Processor Interface Alliance (MIPI) and derive certain implementation aspects from the I2C protocol. Original implementations of the I2C protocol supported data signaling rates of up to 100 kilobits per second (100 kbps) in standard-mode operation, with more recent standards supporting speeds of 400 kbps in fast-mode operation, and 1 megabit per second (Mbps) in fast-mode plus operation. In some examples, a multi-master protocol may be used such that one or more devices can serve as a bus master or as a slave device in different transactions conducted over the serial bus.

As applications have become more complex, it has become desirable to increase performance and throughput provided by serial buses used to couple two or more devices while minimizing interconnections between IC devices.

SUMMARY

Certain aspects of the disclosure relate to systems, apparatus, methods and techniques that provide point-to-point capabilities between multiple pairs of devices without the expected increase in input/output (I/O) pad usage. In some examples, point-to-point data lines are provided between multiple master interfaces in a host and multiple slave devices. Timing of communication is controlled using a clock signal shared by the multiple slave devices.

In one aspect of the disclosure, an apparatus for data communication has a plurality of bus master circuits, each bus master circuit being configured to control point-to-point communication with a corresponding slave device, and a clock generation circuit configured to provide pulses in a serial bus clock signal when one or more of the plurality of bus master circuits are in an active state and communicating with its corresponding slave device, and further configured to idle the serial bus clock signal when each of the plurality of bus master circuits is in an idle state. The serial bus clock signal may be transmitted over a common clock line to each slave device coupled to one of the plurality of bus master circuits. Each bus master circuit may be further configured to communicate with its corresponding slave device in accordance with the timing provided by the serial bus clock signal.

In one aspect of the disclosure, a method for data communication includes configuring a plurality of bus master circuits to control point-to-point communication with a corresponding slave device and configuring a clock generation circuit to: provide pulses in a serial bus clock signal when one or more of the plurality of bus master circuits are in an active state and communicating with its corresponding slave device; and idle the serial bus clock signal when each of the plurality of bus master circuits is in an idle state. The serial bus clock signal may be transmitted over a common clock line to each slave device coupled to one of the plurality of bus master circuits. Each bus master circuit may be further configured to communicate with its corresponding slave device in accordance with the timing provided by the serial bus clock signal.

In one aspect of the disclosure, a computer-readable medium stores computer executable code, the code when executed by a processor cause the processor to configure a plurality of bus master circuits to control point-to-point communication with a corresponding slave device and configure a clock generation circuit to: provide pulses in a serial bus clock signal when one or more of the plurality of bus master circuits are in an active state and communicating with its corresponding slave device; and idle the serial bus clock signal when each of the plurality of bus master circuits is in an idle state. The serial bus clock signal may be transmitted over a common clock line to each slave device coupled to one of the plurality of bus master circuits. Each bus master circuit may be further configured to communicate with its corresponding slave device in accordance with the timing provided by the serial bus clock signal.

In some examples, each of a plurality of serial data I/O pads is configured to couple one of the plurality of bus master circuits to its corresponding slave device through a point-to-point data line. The host device may cause a first bus master circuit in the plurality of bus master circuits to maintain its corresponding serial data I/O pad in a high signaling state when the first bus master circuit is in the idle state and cause the first bus master circuit to initiate each transaction with its corresponding slave device by providing a start condition using signaling states of the serial data I/O pad and the common clock line. The host device may provide the start condition by driving the serial data I/O pad from the high signaling state to a low signaling state while the common clock line is in the high signaling state. The common clock line may be in the high signaling state when the serial bus clock signal is idle. The host device may provide the start condition by transmitting a pulse on the serial bus clock signal in implementations where the common clock line may be in the high signaling state while the pulse is on the serial bus clock signal, and then driving the serial data I/O pad from the high signaling state to the low signaling state at least a protocol-specified minimum time before a next negative transition in the serial bus clock signal.

In some examples, the host device may terminate each transaction with its corresponding slave device by providing a stop condition using signaling states of the serial data I/O pad and the common clock line. The host device may provide the stop condition by driving the serial data I/O pad from the low signaling state to the high signaling state while the common clock line is in a high signaling state.

In some examples, the host device may route a first data stream between a first application and a first slave device using a first bus master circuit in the plurality of bus master circuits hat is configured to control communication with the first slave device, route a second data stream between a second application and a second slave device using a second bus master circuit that is configured to control communication with the second slave device, and enforce data stream security by maintain separation between the first data stream and the second data stream. The separation between the first data stream and the second data stream may be maintained by providing separate processing services, memory or registers to route data for the respective applications and slave devices.

In some examples, the host device may configure at least one multidrop bus master circuit to control communication with a plurality of multidrop slave devices over a common data line in accordance with the timing provided by the serial bus clock signal.

In some examples, the host device may configure at least one of the plurality of bus master circuits to communicate with its corresponding slave device in accordance with an I2C protocol. The host device may configure at least one of the plurality of bus master circuits to communicate with its corresponding slave device in accordance with an I3C protocol.

DETAILED DESCRIPTION

Figure 1:
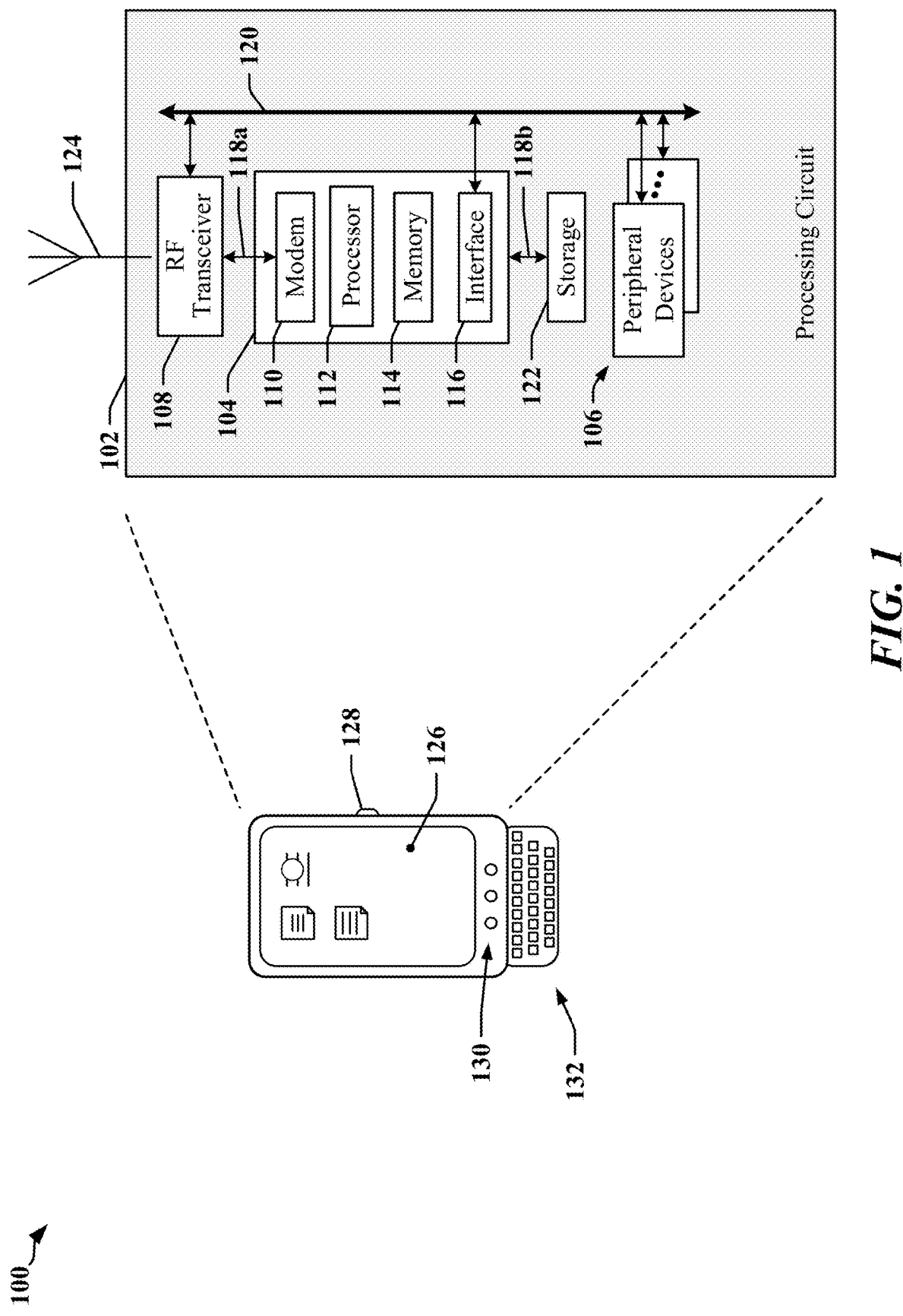
FIG. 1 illustrates an apparatus employing a data link between IC devices that is selectively operated according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect an application processor or other host device with modems and other peripherals. The serial bus may be operated in accordance with specifications and protocols defined by a standards body. In various examples illustrated in this disclosure, the serial bus may be operated in accordance with a standard or protocol that defines timing relationships between signals and transmissions, such as an I2C and/or I3C protocol. In certain applications, a multidrop serial bus may be used to connect a pair of devices in a point-to-point architecture. The point-to-point architecture may be employed when an application requires or calls for a secure connection between the pair of devices. In some instances, the use of a point-to-point architecture may yield performance benefits measurable in higher throughput, lower latency, and/or faster bus turn-around. However, the use of a point-to-point configuration increases the number of general purpose input/output (GPIOs) pads or pins necessary to support multiple point-to-point links, which can increase the complexity and cost of the SoC or other IC devices.

Certain aspects of this disclosure enable a host device or application processor to support point-to-point communication with multiple devices in accordance with an I2C or I3C protocol while restraining the number of additional GPIO pads or pins needed to implement the point-to-point architecture. In one aspect, multiple serial data links can be configured to share a single clock signal generated by the host device.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include a processing circuit 102 having multiple circuits or devices 104, 106 and/or 108, which may be implemented in one or more ASICs or in an SoC. In one example, the apparatus 100 may be a mobile communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system having an application programming interface (API) layer that enables one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
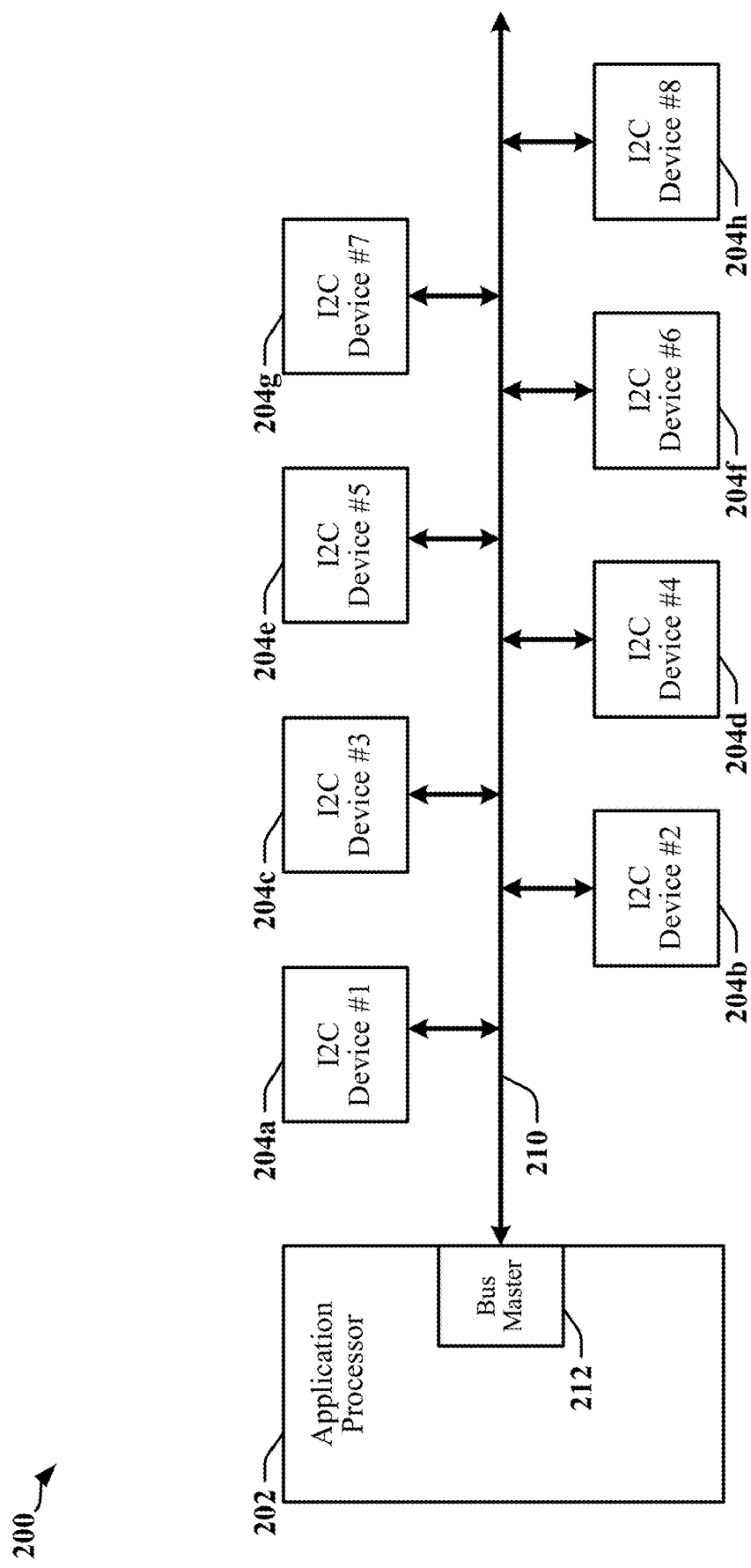
FIG. 2 illustrates a communication interface in which a plurality of devices is connected using a serial bus.

FIG. 2 illustrates a system 200 in which multiple devices 204a-204h are connected through a multidrop serial bus 210. In one example, the devices 204a-204h may be adapted or configured to communicate over the serial bus 210 in accordance with an I2C protocol. In some instances, one or more of the devices 204a-204h may alternatively or additionally communicate using other protocols, including an I3C protocol, for example.

Communication over the serial bus 210 may be controlled by a bus master 212, which is provided in an application processor 202 in the illustrated system 200. In one mode of operation, the bus master 212 may be configured to provide a clock signal that controls timing of a data signal. The wire that carries the clock signal on a serial bus may be interchangeably referred to herein as "SCLK" or "SCL" and a wire that carries a data signal on a serial bus may be interchangeably referred to herein as "SDATA" or "SDA" or the like. In certain modes of operation, two or more of the devices 204a-204h may be configured to exchange data encoded in symbols, where timing information is embedded in the transmission of the symbols.

Figure 3:
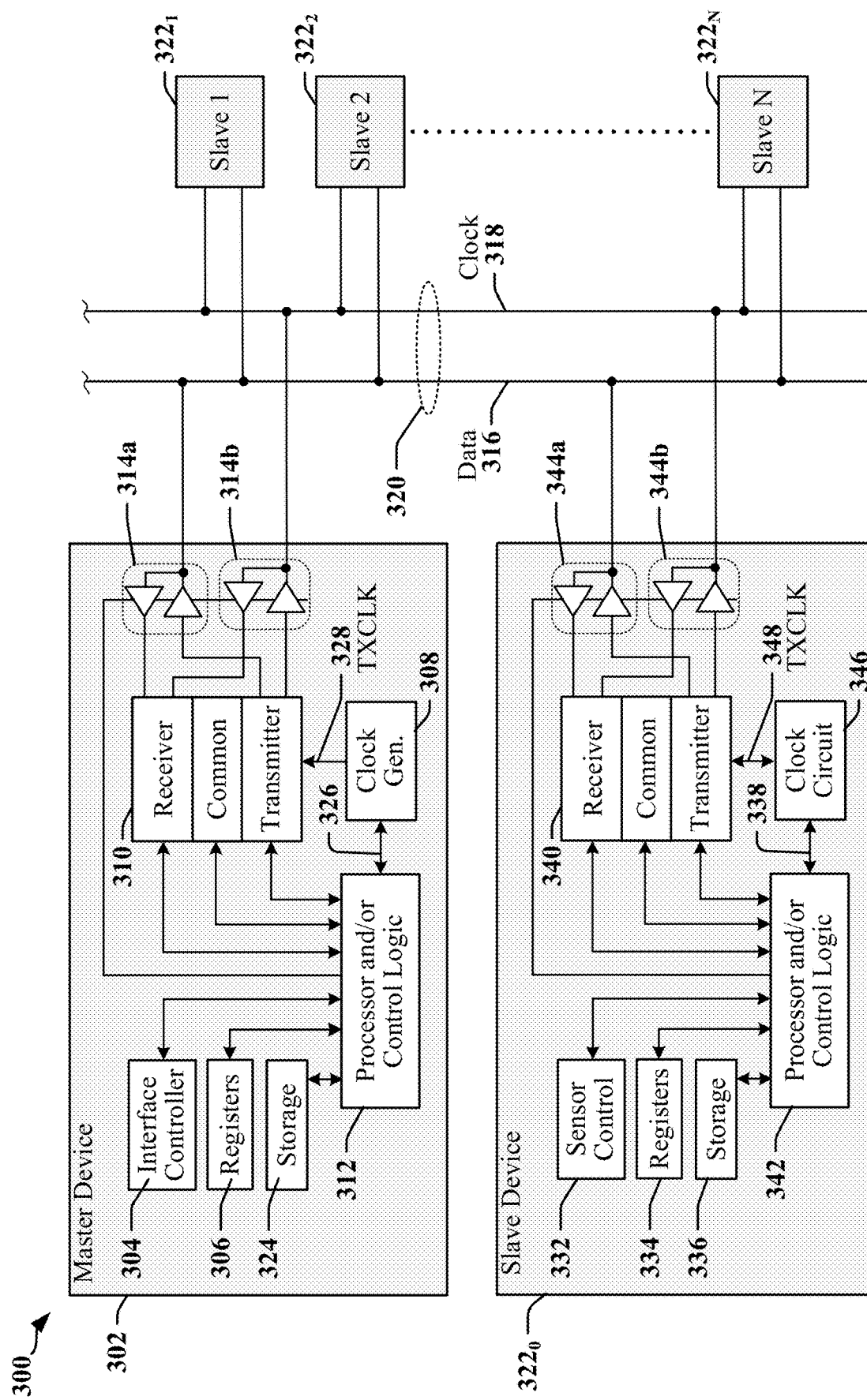
FIG. 3 illustrates certain aspects of system that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that can manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The illustrated bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device 322o configured to operate as a slave device may provide a control function, module or circuit 332 that includes circuits and modules to support a display, an image sensor, and/or circuits and modules that control and communicate with one or more sensors that measure environmental conditions. The slave device 322o may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with I2C, I3C, RFFE, SPMI, or another protocols. At least one device 302, $322_0$-$322_N$ may be configured to operate as both a bus master device and a slave device on the serial bus 320. Two or more devices 302, $322_0$-$322_N$ may be configured to operate as a bus master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Data Transfers Over a Serial Bus

Examples of data transfers, including control signaling, command and payload transmissions are provided by way of example. The examples illustrated relate to I2C and I3C communication for convenience. However, certain concepts disclosed herein are applicable to other bus configurations and protocols, including RFFE and SPMI configurations. Certain concepts are applicable to serial buses that are operated in accordance with various I3C protocols. In one example, these concepts may be implemented when the serial bus is operated in accordance with an I3C HDR double data rate (HDR-DDR) protocol, where timeslots may be defined in HDR-DDR words or in the number of clock pulses. In another example, these concepts may be implemented when the serial bus is operated in accordance with a protocol that supports multiple data lanes.

Figure 4:
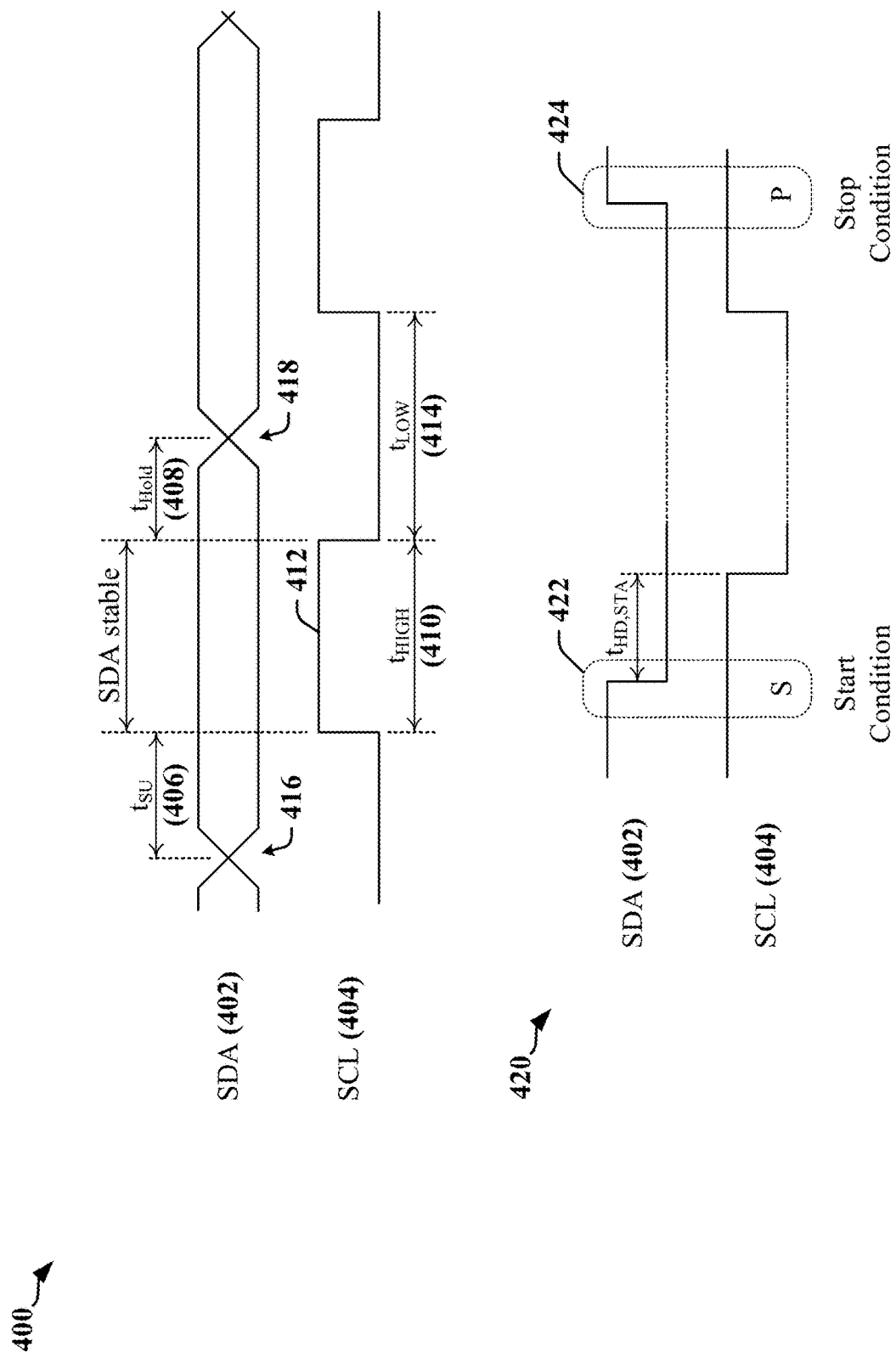
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 when the serial bus is operated in an I2C or I3C mode. The first timing diagram 400 illustrates the timing relationship between the SDA wire 402 and the SCL wire 404 while data is being transferred over a conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

In one example, specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{Low}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a serial bus. Certain protocols provide for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The bus master initially transmits the start condition 422, which may be also be referred to as a start bit, followed by a 7-bit address of an I2C slave device with which it wishes to exchange data. The address is followed by a single bit that indicates whether a read or write operation is to occur. If no slave device responds, the bus master may interpret the high logic state of the SDA wire 402 as a NACK. The addressed slave device, if available, responds with an ACK bit after which the bus master and slave devices may exchange bytes of information in data frames. Bytes of data are serialized in the in data frames such that the most significant bit (MSB) is transmitted first. The transmission of the byte is completed when a stop condition 424 is transmitted by the bus master device. The stop condition 424 occurs when the SDA wire 402 transitions from low to high while the SCL wire 404 is high.

Figure 5:
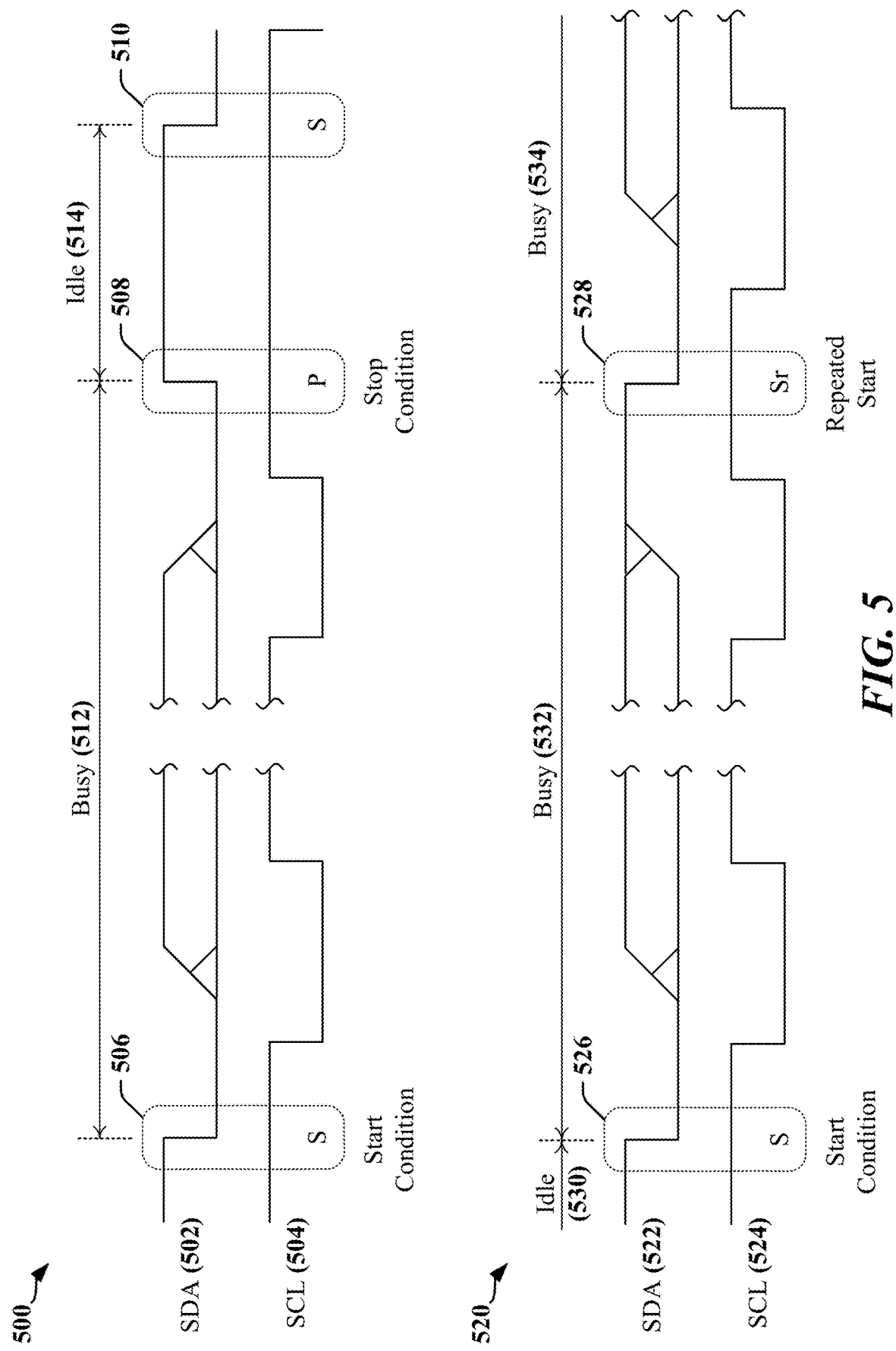
FIG. 5 is a timing diagram that illustrates timing associated with multiple frames transmitted on an I2C bus.

FIG. 5 includes diagrams 500 and 520 that illustrate timing associated with data transmissions on a serial bus operated in accordance with an I2C or I3C protocol. As illustrated in the first diagram 500, an idle period 514 may occur between a stop condition 508 and a next start condition 510. In the illustrated example, the SDA line 502 and SCL line 504 may be held and/or driven to a high voltage state during the idle period 514. This idle period 514 may be prolonged and may result in reduced data throughput when the serial bus remains idle between the stop condition 508 and the next start condition 510. In operation, a busy period 512 commences when the I2C bus master transmits a first start condition 506, followed by data. The busy period 512 ends when the bus master transmits a stop condition 508 and the idle period 514 ensues. The idle period 514 ends when the next start condition 510 is transmitted.

The second timing diagram 520 illustrates a method by which the number of occurrences of an idle period 514 may be reduced. In the illustrated example, data is available for transmission before a first busy period 532 ends. The bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
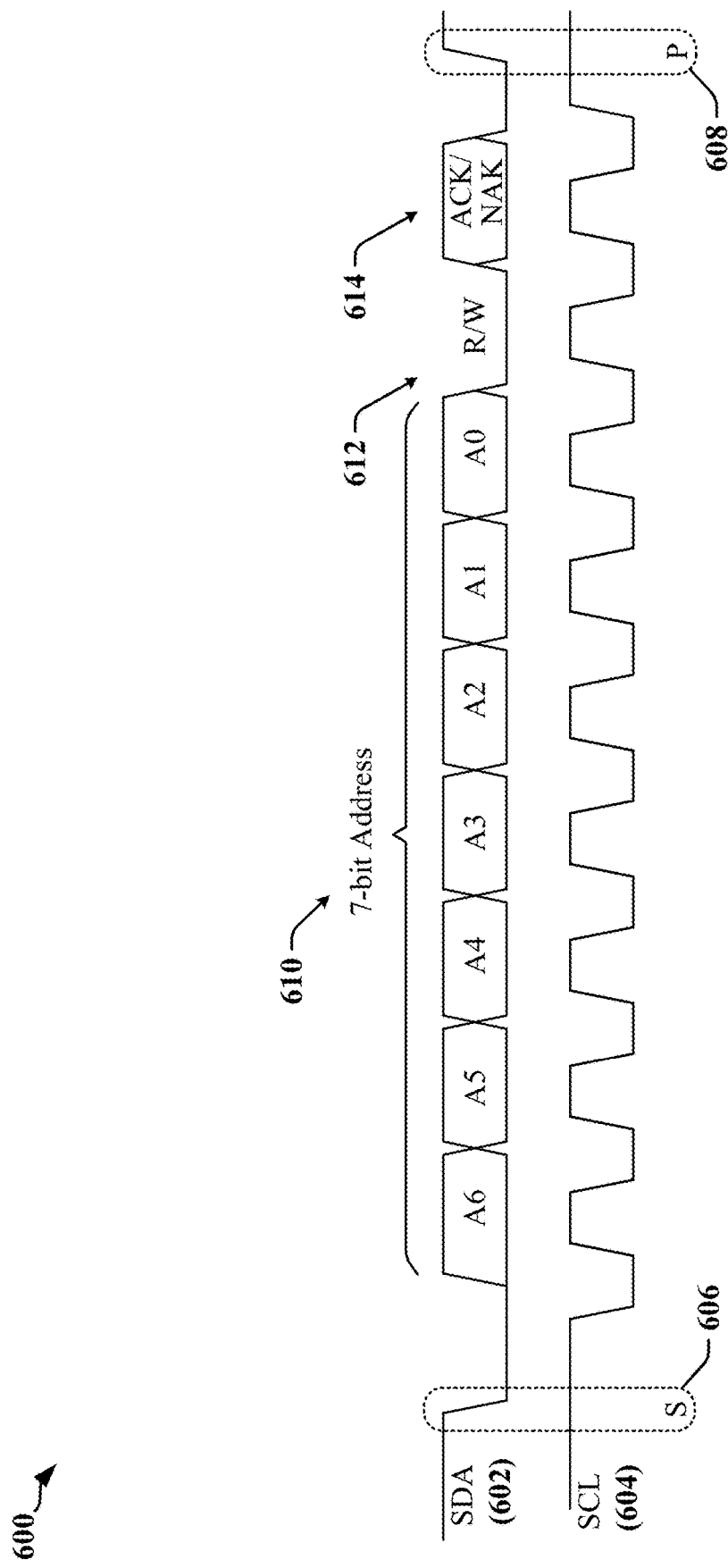
FIG. 6 illustrates timing related to a command word sent to a slave device in accordance with I2C protocols.

FIG. 6 is a diagram 600 that illustrates an example of the timing associated with an address word sent to a slave device in accordance with certain I2C and/or I3C protocols. The address word is transmitted using drivers that are operated in an open-drain mode. In the example, a master device initiates the transaction with a start condition 606, whereby the SDA wire 602 is driven from high to low while the SCL wire remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the serial bus is in an active state.

Figure 7:
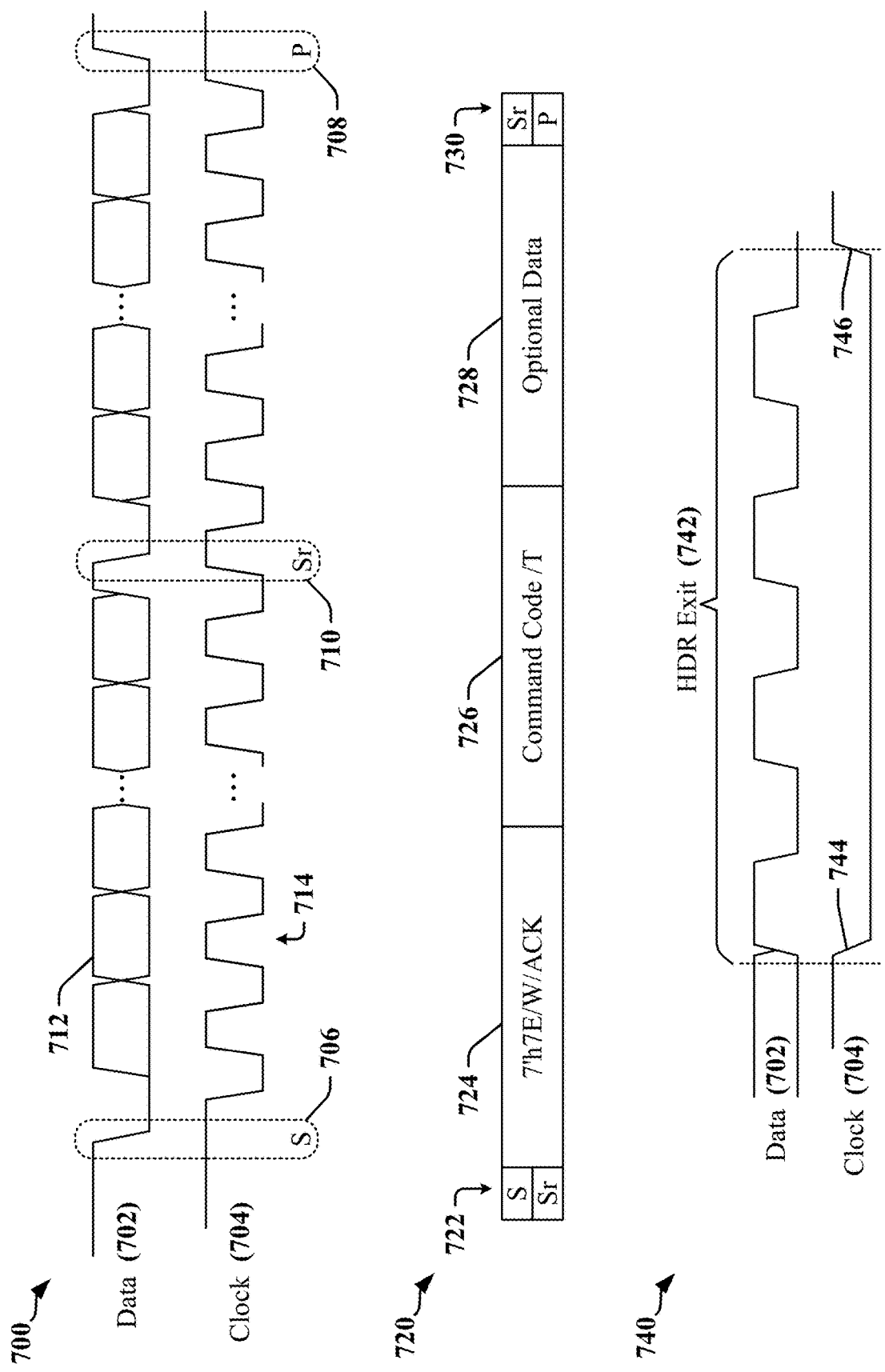
FIG. 7 includes a timing diagram that illustrates an example of signaling on a serial bus when the serial bus is operated in a mode of operation defined by I3C specifications.

FIG. 7 includes a timing diagram 700 that illustrates signaling on a serial bus when the serial bus is operated in an SDR mode of operation defined by I3C specifications. Data transmitted on a first wire of the serial bus, which may be referred to as the Data wire 702, SDA or SDATA, may be captured using a clock signal transmitted on a second wire of the serial bus, which may be referred to as the Clock wire 704 or SCL. During data transmission, the signaling state 712 of the Data wire 702 (SDA) is expected to remain constant for the duration of the pulses 714, defined as the interval in which the Clock wire 704 is at a high voltage level. Transitions on the Data wire 702 when the Clock wire 704 is at the high voltage level indicate a START condition 706, a STOP condition 708 or a Repeated Start 710.

On an I3C serial bus, a START condition 706 is defined to permit the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A Repeated Start 710 may be transmitted by a bus master that wishes to initiate a second transmission upon completion of a first transmission. The Repeated Start 710 is transmitted instead of a STOP condition 708 and has the significance of a STOP condition 708 followed immediately by a START condition 706. The Repeated Start 710 occurs when the Data wire 702 transitions from high to low while the Clock wire 704 is high.

FIG. 7 illustrates transmission of a Common Command Code (CCC) by the bus master. A CCC transmission 720 may occur when the serial bus is operated in an SDR mode of operation defined by I3C specifications. The bus master transmits an initiator 722 that may be a START condition or a Repeated Start prior to transmitting an address of a slave device, a command, and/or data. The initiator 722 may be followed in transmission by an address header 724 and a command code 726. The command code 726 may, for example, cause the serial bus to transition to a desired mode of operation. In some instances, data 728 may be transmitted. The CCC transmission 720 may be followed by a terminator 730 that may be a STOP condition 708 or a Repeated Start 710.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal. A bus master may transmit CCCs to switch the mode of operation of an I3C bus between SDR and HDR modes.

FIG. 7 includes an example of signaling 740 transmitted on the Data wire 702 and the Clock wire 704 to initiate a restart, exit and/or break from I3C HDR modes of communication. The signaling 740 includes an HDR Exit 742 that may be used to cause an HDR break or exit. The HDR Exit 742 commences with a falling edge 744 on the Clock wire 704 and ends with a rising edge 746 on the Clock wire 704.

While the Clock wire 704 is in a low signaling state, four pulses are transmitted on the Data wire 702. I2C devices ignore the Data wire 702 when no pulses are provided on the Clock wire 704.

In-band interrupts may be used to gain access to an I3C serial bus through an enumeration process in which a bus master device can identify slave devices coupled to the I3C serial bus. The enumeration process may be used during system initialization to assign dynamic addresses to slave devices. The bus master device may use system initialization to permit the bus master device to determine capabilities of the slave devices and/or to configure one or more of the slave devices. In-band interrupts may also be used by slave devices to transmit high-priority and/or low-latency messages.

Figure 8:
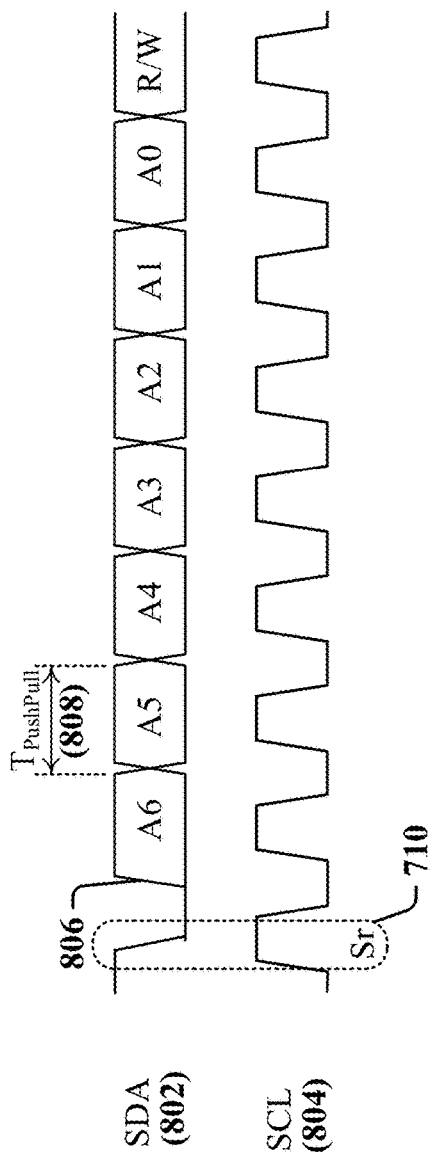
FIG. 8 illustrates a non-arbitrable address header and an arbitrable address header that may be transmitted in accordance with I3C protocols.
Figure 8:
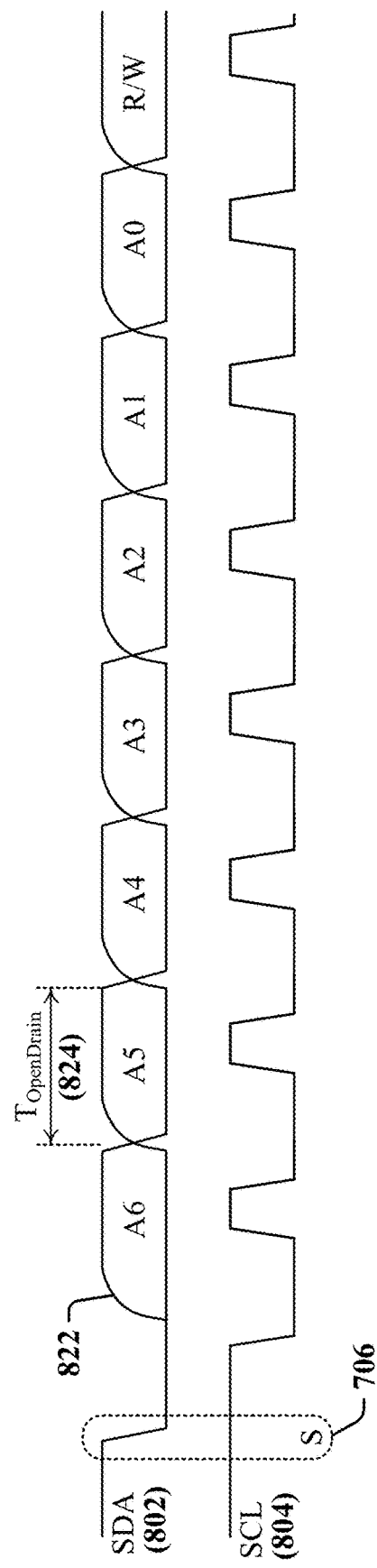

A device other than the current bus master may assert an in-band interrupt during transmission of certain address fields to initiate an arbitration process that enables the asserting device to gain access to a serial bus. The serial bus may be operated in a mode in which data is transmitted on a data line in accordance with timing provided by a clock signal transmitted on a clock line. FIG. 8 illustrates a non-arbitrable address header 800 and an arbitrable address header 820 that may be transmitted on the SDA line 802 of the serial bus in accordance with I3C protocols. I3C protocols provide for different types of request to be transmitted using an I3C arbitrable address header. I3C arbitrable address headers 820 can be transmitted after a START condition 706. An address header 724 transmitted after a Repeated Start 710 is not arbitrable. A device may use an I3C arbitrable address header to assert an In-Band Interrupt, make a secondary bus master request, or indicate a hot-join request.

A non-arbitrable address header 800 is transmitted using push-pull drivers, while open-drain drivers are enabled during transmission of an arbitrable address header 820. Rising edges 806 in a push-pull transmission provide a shorter bit interval 808 than the bit interval 824 available during an open-drain transmission, due to the slow rise time of the pulled-up edges 822 in a non-arbitrable address header 800. In FIG. 8, the bit intervals 808, 824 are not depicted on a common scale.

A clock signal transmitted on the SCL line 804 provides timing information that is used by a slave device to control transmission of bits on the SDA line 802, where the clock signal may be used by a receiving device for sampling and/or capturing bits of data transmitted on the SDA line 802. A bus master device may read one or more registers on a slave device or secondary bus master device that wins arbitration. In conventional systems, the bus master device may provide clock pulses in a clock signal that have a period sufficient to successfully read the slowest possible device coupled to the serial bus. Each slave device has different operating characteristics and limitations that affect the response time of the slave device. In one example, the response time of a slave device may be affected by the physical distance between the slave device and the bus master device. In another example, the response time of a slave device may be affected by the processing capabilities of the slave device, where a slower controller, state machine or other processor in the slave device may delay responses transmitted by the slave device during in-band interrupt handling and/or processing.

Point-to-Point Operations

In many examples, I2C, I3C and other such protocols are used to operate a two-wire data communication link as a serial, hierarchical, multi-master, multidrop, serial bus. I2C and I3C protocols support transactions in which data payloads bookended by bus management commands can be addressed to one or more devices coupled to the serial bus. In some examples, the I2C and I3C protocols may be used to operate a data communication link that has been configured to couple a pair of devices in a two-wire serial, point-to-point topology. In one example, a point-to-point serial bus may be configured when one or more applications are expected to demand low latency access to the data communication link or when one or more applications are expected to generate high data throughput.

Figure 9:
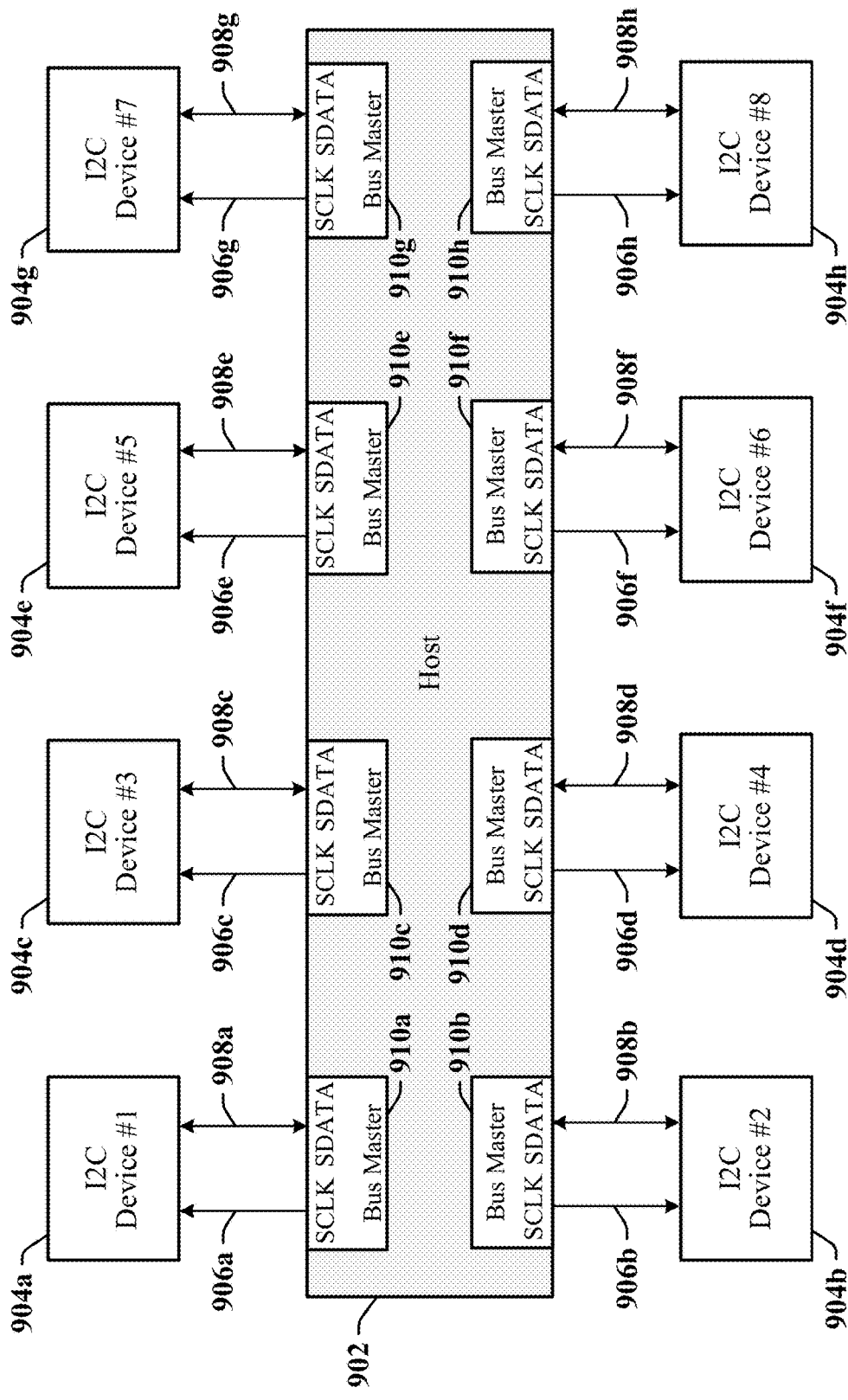
FIG. 9 illustrates a system in which multiple devices are configured to connect to a host device using dedicated point-to-point serial buses.

FIG. 9 illustrates a system 900 in which multiple devices 904a-904h are configured to connect to a host device 902 using dedicated point-to-point serial buses. The host device 902 may include at least one application processor and multiple bus interfaces. In one example, each device 904a-904h is coupled in a point-to-point configuration with a corresponding bus master 910a-910h provided by the host device 902. In some examples, the devices 904a-904h may be adapted or configured to communicate with corresponding bus masters 910a-910h in accordance with an I2C protocol or an I3C protocol. In these examples, each device 904a-904h is coupled to a corresponding bus master 910a-910h through respective pairs of wires configured as SCLK 906a-906h and SDATA 908a-908h in a point-to-point serial data communication link. In some examples, one or more of the devices 904a-904h may communicate over their corresponding point-to-point data communication links using other protocols. In some examples, one of devices 904a-904h may communicate with its corresponding or assigned bus master 910a-910h using an I2C protocol while other devices communicate with their corresponding or assigned bus masters 910a-910h using an I3C or other different protocol.

The system 900 of FIG. 9 and the system 200 of FIG. 2 may be indistinguishable from an application's perspective when lower-level the management and control functions are configured to adapt to the topology and configuration of the serial bus and to manage the addressing of devices coupled to each serial bus. However, applications that use a system 200 configured for multidrop operation may need to accommodate latencies associated with unavailability of the serial bus due to competition between multiple devices 204a-204h for access to the serial bus 210, as well as latencies attributable to bus busy conditions when transmissions are already in progress. Latencies affecting applications that use the system 900 configured for point-to-point operation may be limited to delays associated with competition between application for a single one of the devices 904a-904h, as well as delays associated with transmissions in progress. The use of a point-to-point configuration, such as the system 900 illustrated in FIG. 9, can be used to secure communication during transmission between sources of data and sinks or consumers of data. The use of a point-to-point configuration, such as illustrated in the system 900 in FIG. 9, can provide maximized bandwidth and improved data throughput by reducing or eliminating overheads associated with bus arbitration and other bus management facilities required for multidrop operation. However, the use of a point-to-point configuration increases the required number of GPIO pads or pins, which can increase the complexity and cost of the host device 902.

Certain aspects of this disclosure enable a host device or application processor to support point-to-point communication with multiple devices in accordance with an I2C or I3C protocol using a reduced number of GPIO pads or pins with respect to the system 900 of FIG. 9. In one aspect, multiple serial data links can be configured to share a single clock signal generated by the host device.

Figure 10:
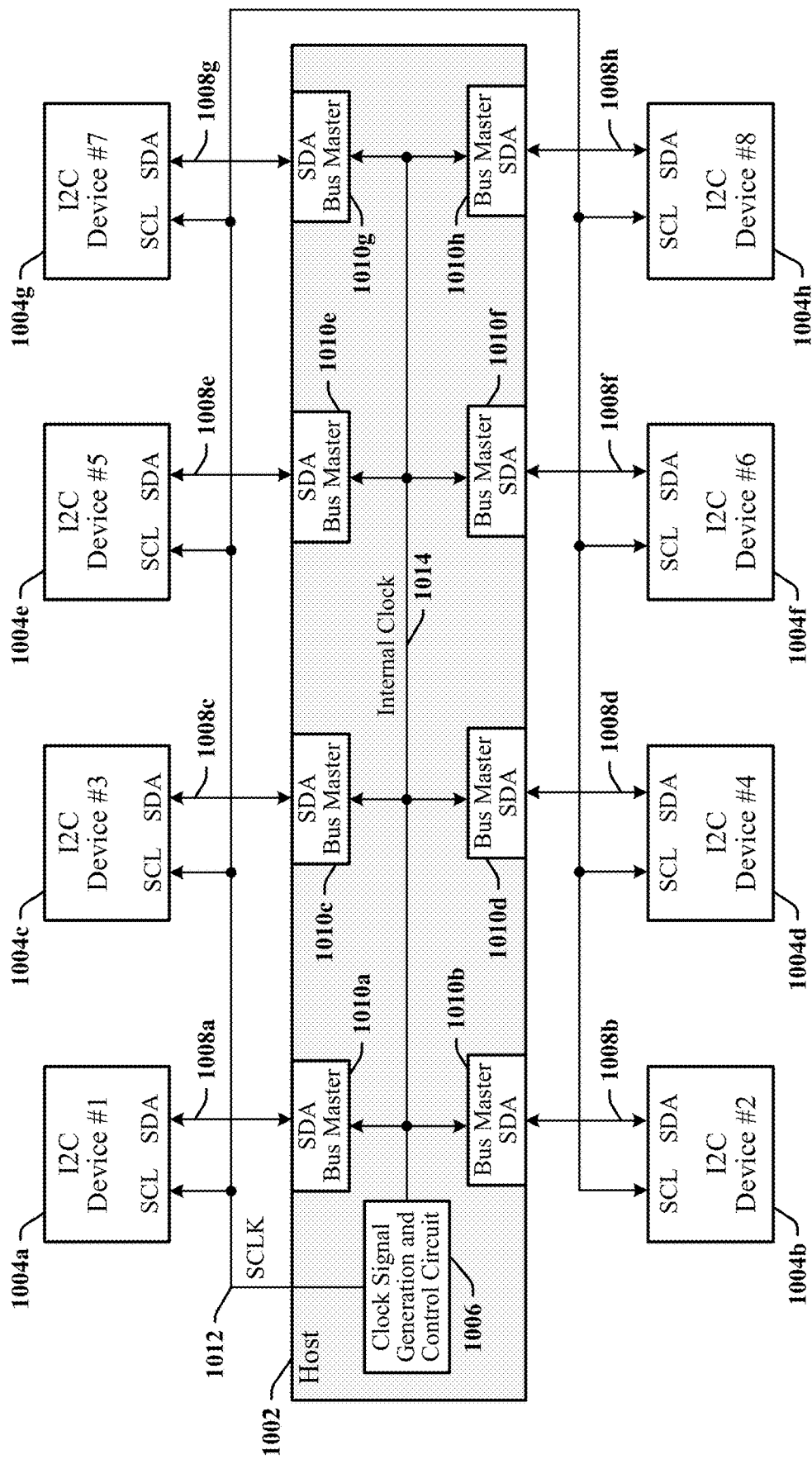
FIG. 10 illustrates a system that implements multiple point-to-point serial links configured to share a clock signal in accordance with certain aspects of this disclosure.

FIG. 10 illustrates a system 1000 that implements multiple point-to-point serial links configured to share a clock signal in accordance with certain aspects of this disclosure. In the illustrated example, a host device 1002 provides one or more clock signals that may be provided as an internal clock signal 1014 and/or transmitted over the shared or common SCLK 1012 and used to control timing of data transmissions over each of the SDAs 1008a-1008h of the point-to-point serial links. The host device 1002 may include at least one application processor and a clock generation circuit 1006 that is coupled to SCLK 1012. The internal clock signal 1014 provided by the clock generation circuit 1006 is used by point-to-point bus master circuits 1010a-1010h to control timing of transmitters and receivers coupled to respective data lines (SDAs 1008a-1008h). The data lines may be configured as point-to-point connections between the point-to-point bus master circuits 1010a-1010h and correspondent devices 1004a-1004h.

The clock generation circuit 1006 may be configured to provide a clock signal that is transmitted over SCLK 1012 when a transaction is initiated for any of the correspondent devices 1004a-1004h. An active correspondent device 1004a-1004h may use the clock signal transmitted over SCLK 1012 to control timing of a transmitter and receiver coupled to its SDA 1008a-1008h.

The clock generation circuit 1006 may supplant or augment the clock generation functions provided in conventional bus masters when point-to-point mode is configured for the system 1000. In the illustrated example, each point-to-point bus master circuit 1010a-1010h provided in accordance with certain aspects of this disclosure can be used to manage communication between the host device 1002 and one of the correspondent devices 1004a-1004h. Each point-to-point bus master circuit 1010a-1010h may generate control signaling that is transmitted over a corresponding SDA 1008a-1008h in accordance with timing provided by the internal clock signal 1014 and the clock signal transmitted on SCLK 1012. Each point-to-point bus master circuit 1010a-1010h may request enablement of clock generation by the clock generation circuit 1006 during transactions with the respective correspondent device 1004a-1004h.

In one example, a point-to-point bus master circuit 1010a-1010h may cooperate with data management circuits to format and frame data to be transmitted to a correspondent device 1004a-1004h over the respective SDA 1008a-1008h. In another example, a point-to-point bus master circuit 1010a-1010h may cooperate with data management circuits to format and frame data received from a correspondent device 1004a-1004h. In some instances, a point-to-point bus master circuit 1010a-1010h may cooperate with data management circuits that can monitor transactions and other communication activity to determine when clock generation by the clock generation circuit 1006 is to be enabled.

Figure 11:
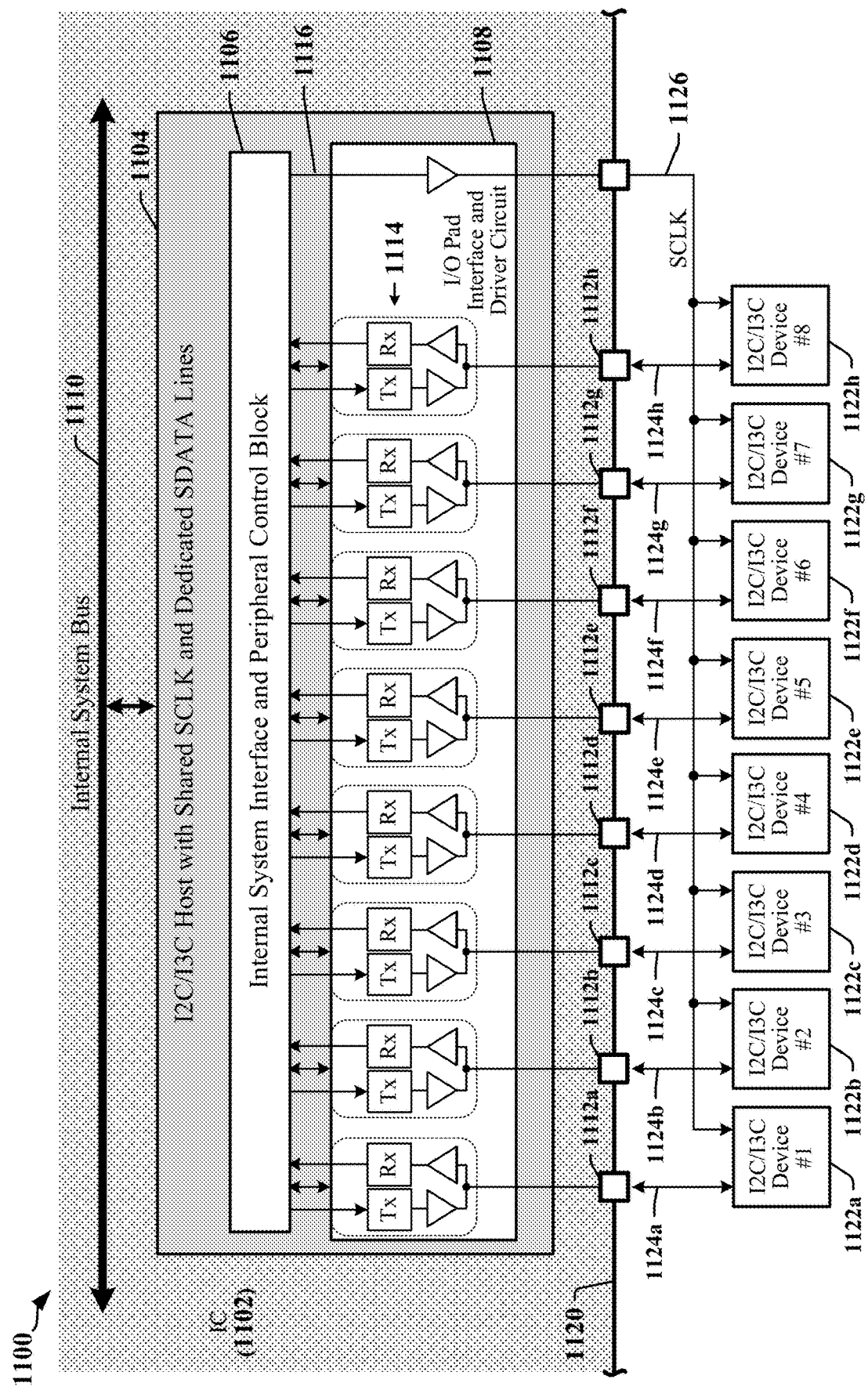
FIG. 11 illustrates an example of an architecture used to implement multiple point-to-point serial links that share a clock signal in accordance with certain aspects of this disclosure.

FIG. 11 provides a schematic illustration of an architecture for a system 1100 that implements multiple point-to-point serial links using a shared clock signal in accordance with certain aspects of this disclosure. In some aspects, the system 1100 may correspond to the system 1000 illustrated in FIG. 10. An IC 1102 operates as a host device 1104 and may include an application processor or other processing element. The host device 1104 generates or provides a clock signal 1116 that can be transmitted over a common SCLK 1126 and that is configured to control timing of transmissions over the multiple point-to-point serial links. The clock signal 1116 may be used internally by a peripheral control circuit 1106 pad interface and/or a driver circuit 1108 to control transmissions over the SDATAs 1124a-1124h. Each peripheral device 1122a-1122h is coupled to the IC 1102 through SCLK 1126 and a respective SDATA 1124a-1124h. In some examples, the point-to-point serial links are operated in accordance with an I2C or I3C protocol.

In the illustrated example, the host device 1104 includes a peripheral control circuit 1106 that serves as an interface between internal components or applications of the IC 1102 and the physical point-to-point serial links. The peripheral control circuit 1106 may include a clock generation circuit that provides the clock signal 1116 used to control timing of transmissions over each SDATA 1124a-1124h. The peripheral control circuit 1106 may include circuits or modules that implement or apply protocols selected for managing communication with the peripheral devices 1122a-1122h over the point-to-point serial links. In one example, the peripheral control circuit 1106 may include circuits or modules configured to format and frame data to be transmitted to a peripheral device 1122a-1122h over the corresponding SDATA 1124a-1124h. In another example, the peripheral control circuit 1106 may include circuits or modules configured to extract data from frames received from a peripheral device 1122a-1122h over the corresponding SDATA 1124a-1124h. The peripheral control circuit 1106 may generate the START, STOP and/or Repeated START signaling defined by I2C protocols based on timing and state of the clock signal 1116. The peripheral control circuit 1106 may enable clock generation circuits to support execution of asynchronous transactions that can be initiated with respect to multiple peripheral devices 1122a-1122h.

In some examples, the peripheral control circuit 1106 includes interface circuits that couple the peripheral control circuit 1106 to an internal system bus 1110 through which internal components of the IC 1102 interact with the point-to-point serial links. The peripheral control circuit 1106 may also include or interact with a pad interface and driver circuit 1108 to amplify, attenuate or otherwise buffer signals communicated across the physical edge 1120 of the IC 1102. In one example, the pad interface and driver circuit 1108 includes a set of transceivers 1114. Each transceiver in the set of transceivers 1114 is coupled to a corresponding SDATA 1124a-1124h through an I/O pad 1112a-1112h and responds to the clock signal 1116 and control signals provided by the peripheral control circuit 1106. The control signals may enable or disable a line driver or receiver. The control signals may select a high-impedance state for the corresponding I/O pad 1112a-1112h.

Figure 12:
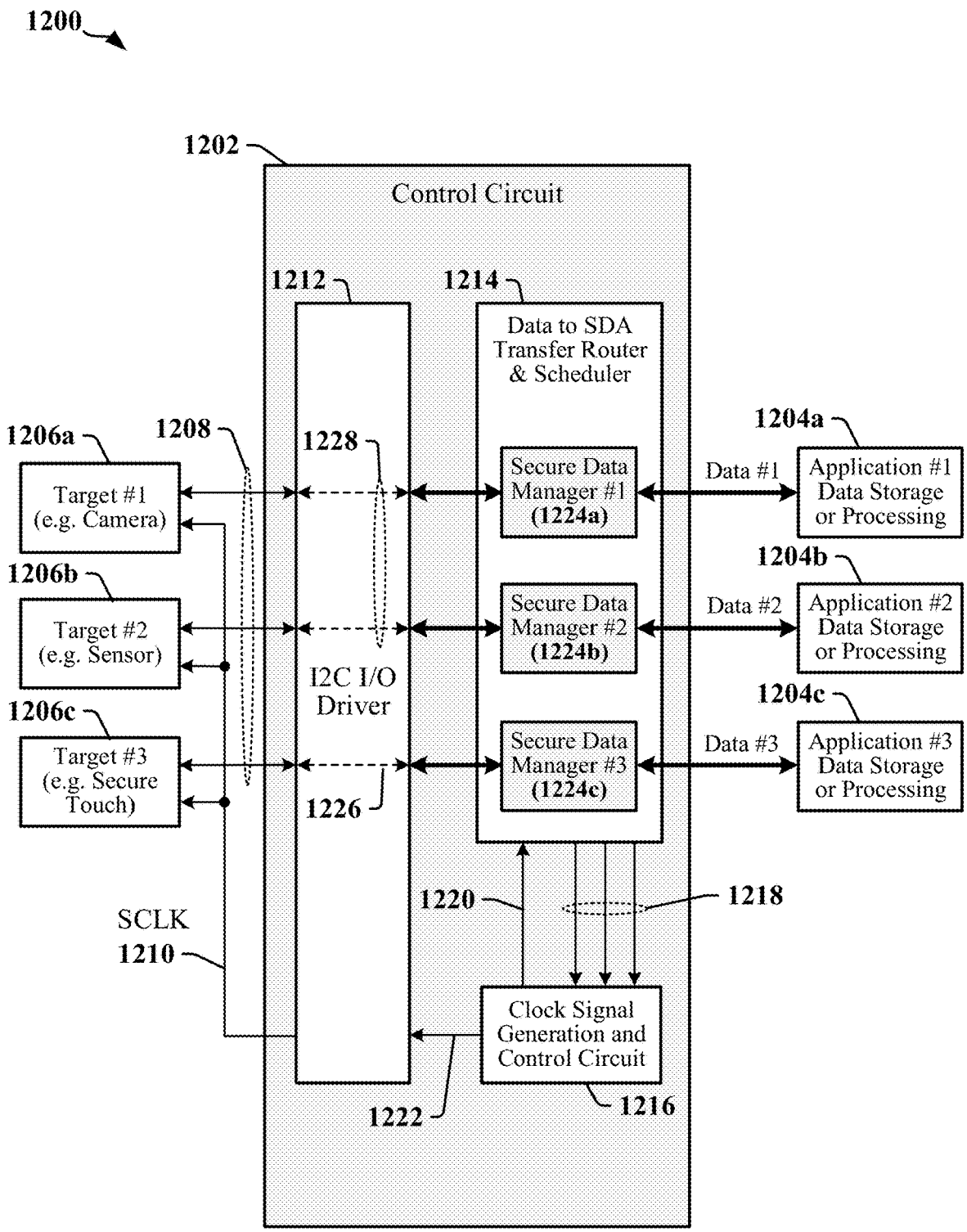
FIG. 12 illustrates an interface control circuit that provides a shared clock signal used by multiple point-to-point serial links in accordance with certain aspects of this disclosure.

FIG. 12 illustrates certain aspects of a system 1200 that implements multiple point-to-point serial links that share a clock signal in accordance with certain aspects of this disclosure. An interface control circuit 1202 may implement various functions of the host device 1104 illustrated in FIG. 11. The interface control circuit 1202 includes an I/O driver circuit 1212 that corresponds to the pad interface and driver circuit 1108 of FIG. 11, a data control circuit 1214 and a clock generation and control circuit 1216. In one aspect, the data control circuit 1214 operates as a router that can direct a data stream received from each of a plurality of sources to a destination for the data stream. In the illustrated example, one or more applications 1204a-1204c may be configured as sources and/or sinks for data exchanged over multiple SDATA lines 1208 that, together with a single SCLK 1210, provide the point-to-point serial links. The applications 1204a-1204c may communicate securely through corresponding data managers 1224a-1224c in the data control circuit 1214. The data managers 1224a-1224c may be configured or configurable to route or direct individual data streams to identified target devices 1206a-1206b. The data managers 1224a-1224c may operate as point-to-point bus masters on respective serial links. In the illustrated example, the target devices 1206a-1206b include a camera, a sensor and a secure touch panel, while the applications 1204a-1204c include handlers or controllers for the camera, sensor or secure touch panel. Other types of peripheral devices may be coupled through point-to-point serial links. In some examples, the target devices 1206a-1206b may include one or more application processors.

The clock generation and control circuit 1216 may be configured to generate a clock signal 1220 used to control timing of transmissions over each of the SDATA lines 1208. The clock signal 1220 is used by the I/O driver circuit 1212 and may be transmitted on SCLK 1210. The clock signal 1220 may be included in a feedback clock signal 1222 provided to the data control circuit 1214. The clock generation and control circuit 1216 may respond to clock request signals 1218 provided by the data control circuit 1214 to determine when SCLK 1210 is to be idled and when the clock signal 1220 is to be actively transmitted on SCLK 1210. In some examples, each of the clock request signals 1218 indicates that one of the data managers 1224a-1224c has received a command or request to read or write a corresponding target devices 1206a-1206b and/or that such a command or request is pending or being executed. In one example, the clock generation and control circuit 1216 may implement a voting scheme to determine when SCLK 1210 is to be idled or activated. In another example, the clock generation and control circuit 1216 may activate SCLK 1210 when any of the data managers 1224a-1224c wishes to initiate a transaction. In another example, the clock generation and control circuit 1216 may idle SCLK 1210 after completion of a transaction. In another example, the clock generation and control circuit 1216 may delay idling SCLK 1210 for a fixed number of clock periods after completion of a transaction.

The I/O driver circuit 1212 may encompass or include portions of the peripheral control circuit 1106 and/or the pad interface and driver circuit 1108 illustrated in FIG. 11. In one example, the I/O driver circuit 1212 may include circuits or modules configured to format and frame data to be transmitted to a target device 1206a-1206b over the corresponding SDATA 1208. In another example, the I/O driver circuit 1212 may include circuits or modules configured to extract data from frames received from a target device 1206a-1206b over the corresponding SDATA 1208. In another example, the I/O driver circuit 1212 may generate Start, Stop and/or Repeated Start signaling defined by I2C protocols based on timing and state of the clock signal 1220. In another example, the I/O driver circuit 1212 may include, or interact with pad interface and driver circuits that are configured to amplify, attenuate or otherwise buffer signals communicated across the boundary of an IC.

In some examples, the data control circuit 1214 can maintain separate channels for data streams between applications 1204a-1204c and respective target devices 1206a-1206b. The data managers 1224a-1224c in the data control circuit may be configured to use separate and distinct processing services, memory and registers to route data between the applications 1204a-1204c and identified target devices 1206a-1206b. It one example, the data control circuit 1214 provides a protected, independent data path 1226 for secure data transfer between a target device 1206c that includes a secure touch input device and a handling application 1204c. The protected, independent data path 1226 can be effectively detached from the other data paths 1228 through the interface control circuit 1202. In some instances, the protected, independent data path 1226 can be established using encryption. In some examples, data streams may be originated by applications. In some instances, a data stream includes unidirectional data sourced from an originating application 1204a-1204c or target device 1206a-1206b.

According to one aspect, the clock signal 1220 is generated and/or provided to SCLK 1210 based on the start time required for a transmission initiated by data managers 1224a-1224c. The number of pulses provided on SCLK 1210 or the duration of active transmission of the clock signal 1220 over SCLK 1210 may be determined by calculating or estimating the number of bits or bytes that are to be transferred during a transaction. In some instances, SCLK consolidation is performed. For example, the number of pulses provided on SCLK 1210, or the duration of active transmission of the clock signal 1220 over SCLK 1210 may reflect at least partially concurrent transmissions on two point-to-point serial links. For example, the total number of pulses provided on SCLK 1210 may be calculated based on the number of pulses required for a first transmission on a first point-to-point serial link and the number of additional pulses required to complete a transmission on a second first point-to-point serial link that starts after the first transmission has started but before the first transmission has ended.

In some examples, SCLK consolidation may be accomplished using clock sensing and a mechanism that is based on voting. Clock sensing may involve monitoring the feedback clock signal 1222 received from the clock generation and control circuit 1216. A voting circuit or module may respond to the request signals 1218 generated by the data control circuit 1214 to determine whether clock pulses are to be provided on SCLK 1210.

The example illustrated in FIG. 12 relates to a system that provides three data paths 1226, 1228 through the interface control circuit 1202 and over separate point-to-point serial links, where each point-to-point serial link includes one SDATA 1208 and SCLK 1210. The concepts disclosed herein are not limited to three data paths 1226, 1228, and a lower or greater number of data paths may be provided to support a desired number of point-to-point serial links.

Figure 13:
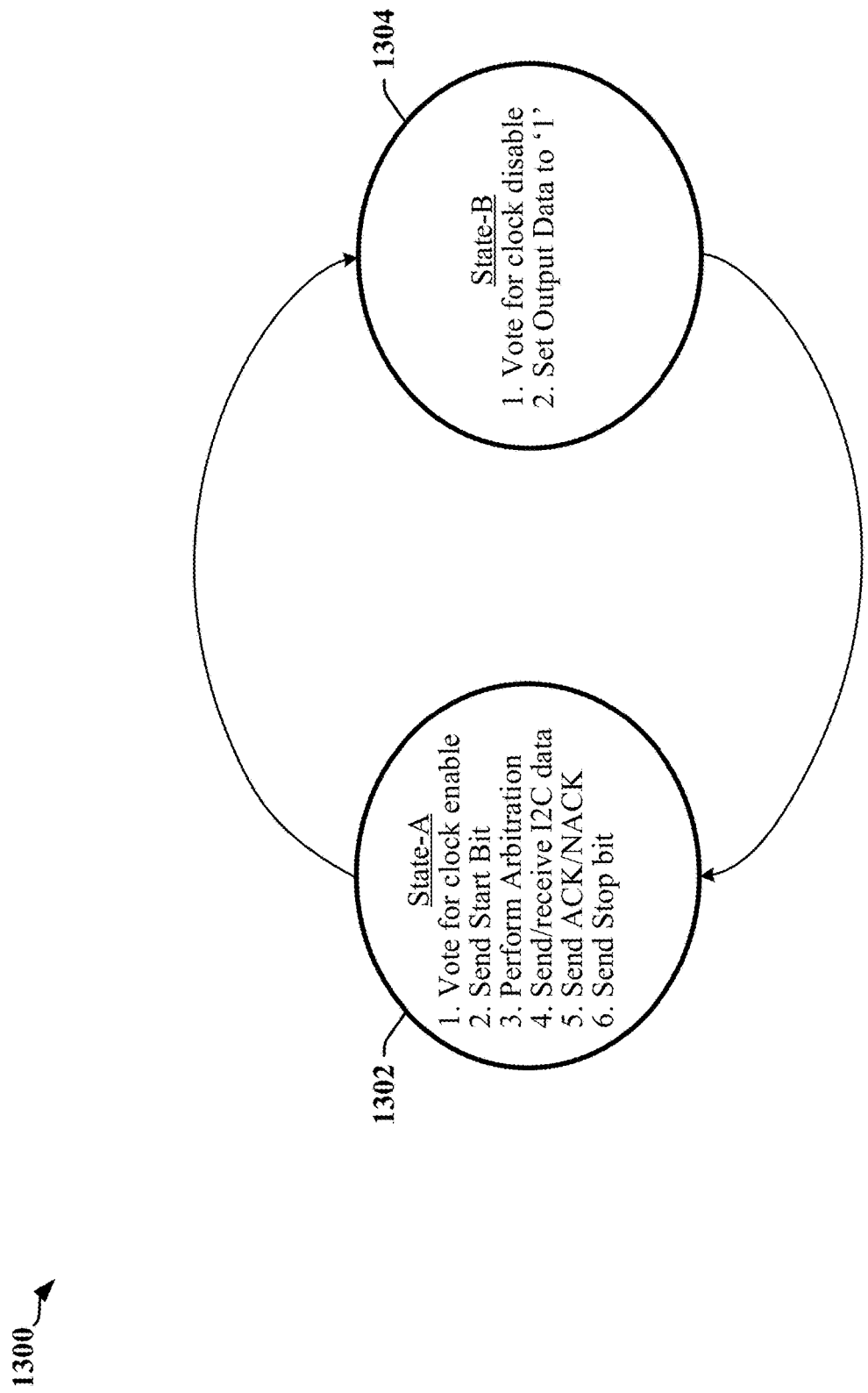
FIG. 13 illustrates state and operation of data managers configured in accordance with certain aspects of this disclosure.

FIG. 13 is a state diagram 1300 that illustrates certain aspects of the operation of each data manager 1224a-1224c illustrated in FIG. 12. In some examples, the data manager 1224a-1224c for each data path can be in one two states. In a first state (illustrated as State-A 1302), a data manager 1224a-1224c can send or receive data. In one example, the data manager 1224a-1224c may request activation and/or transmission of the clock signal 1220 on SCLK 1210. The data manager 1224a-1224c may operate as a conventional bus master while controlling and communicating with one slave device in accordance with an I2C or I3C protocol.

In a second state (illustrated as State-B 1304), a data manager 1224a-1224c is placed in an idle or wait state. In one example, the data manager 1224a-1224c may signal that it has no need for activation and/or transmission of the clock signal 1220 on SCLK 1210. The clock signal 1220 may be transmitted on SCLK 1210 when one or more data managers 1224a-1224c is in an idle or wait state if another data manager 1224a-1224c is active. Accordingly, an inactive data manager 1224a-1224c may be configured to drive its SDATA to a high signaling state to maintain its associated slave device in an idle state.

Figure 14:
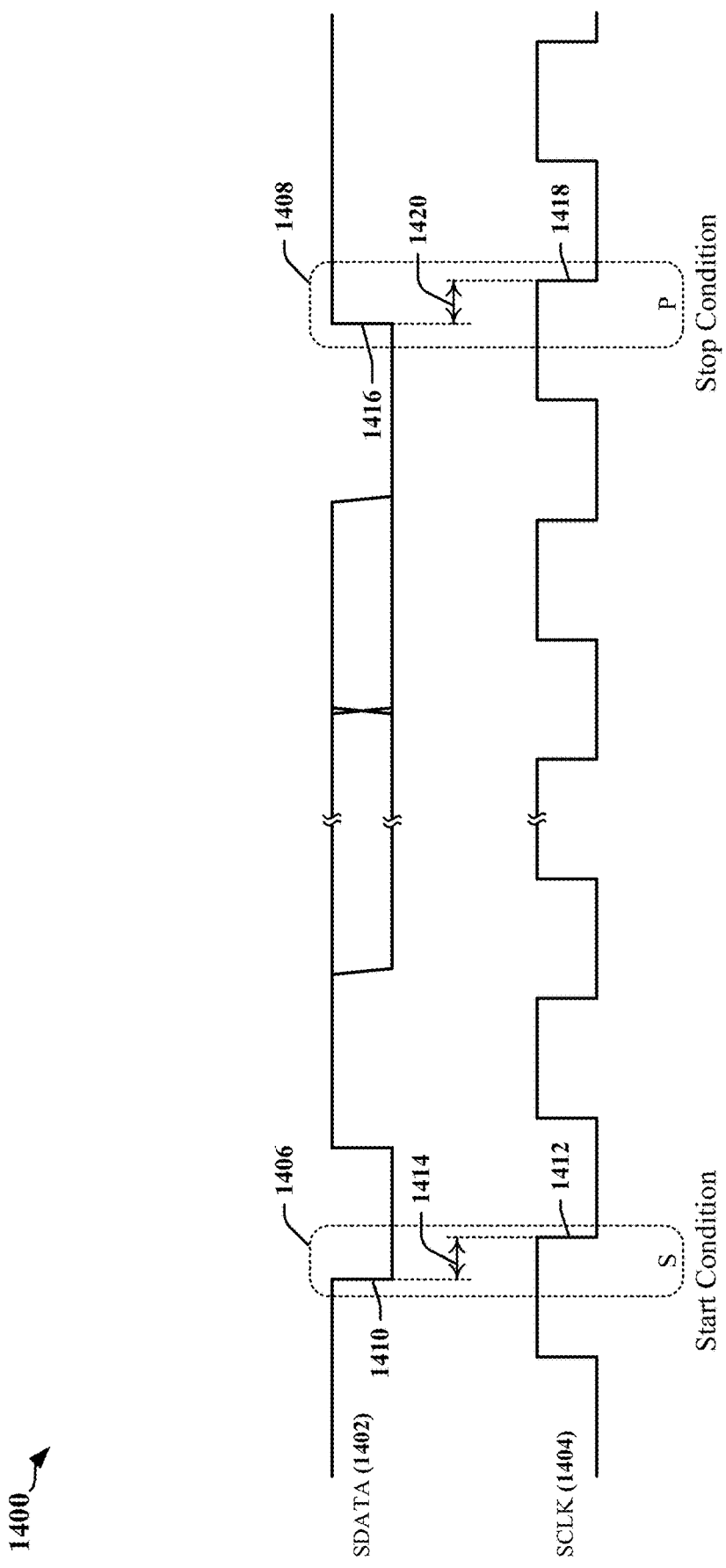
FIG. 14 illustrates certain aspects of control signaling transmitted by a data manager in accordance with certain aspects of this disclosure.

FIG. 14 is a timing diagram 1400 that illustrates certain aspects of control signaling that may be transmitted by a data manager using pulses or transitions on SDATA 1402 while an active clock signal is being transmitted on SCLK 1404. The ability of a slave device to recognize a start condition 1406 or a stop condition 1408 can depend on timing of transitions 1410, 1416 with respect to the next negative transition 1412, 1418 in SCLK 1404.

The START condition 1406 is provided by driving SDATA 1402 to a low signaling state while SCLK 1404 is in a high signaling state. For example, the START condition 1406 may be validly signaled when the data manager provides a negative transition 1410 in SDATA while SCLK 1404 is in a high signaling state and a protocol-specified minimum time 1414 before the next negative transition 1412 in SCLK 1404. In one example, I2C protocols require that the negative transition 1410 in SDATA occurs while SCLK 1404 is in the high signaling state and at least 230 nanoseconds before SCLK 1404 next transitions to the low signaling state. A STOP condition 1408 is provided by driving SDATA 1402 to a high signaling state while SCLK 1404 is in a high signaling state. The STOP condition 1408 may be validly signaled when the data manager provides a negative transition 1410 in SDATA while SCLK 1404 is in a high signaling state and a protocol-specified minimum time 1420 before the next negative transition 1412 in SCLK 1404 is expected.

Figure 15:
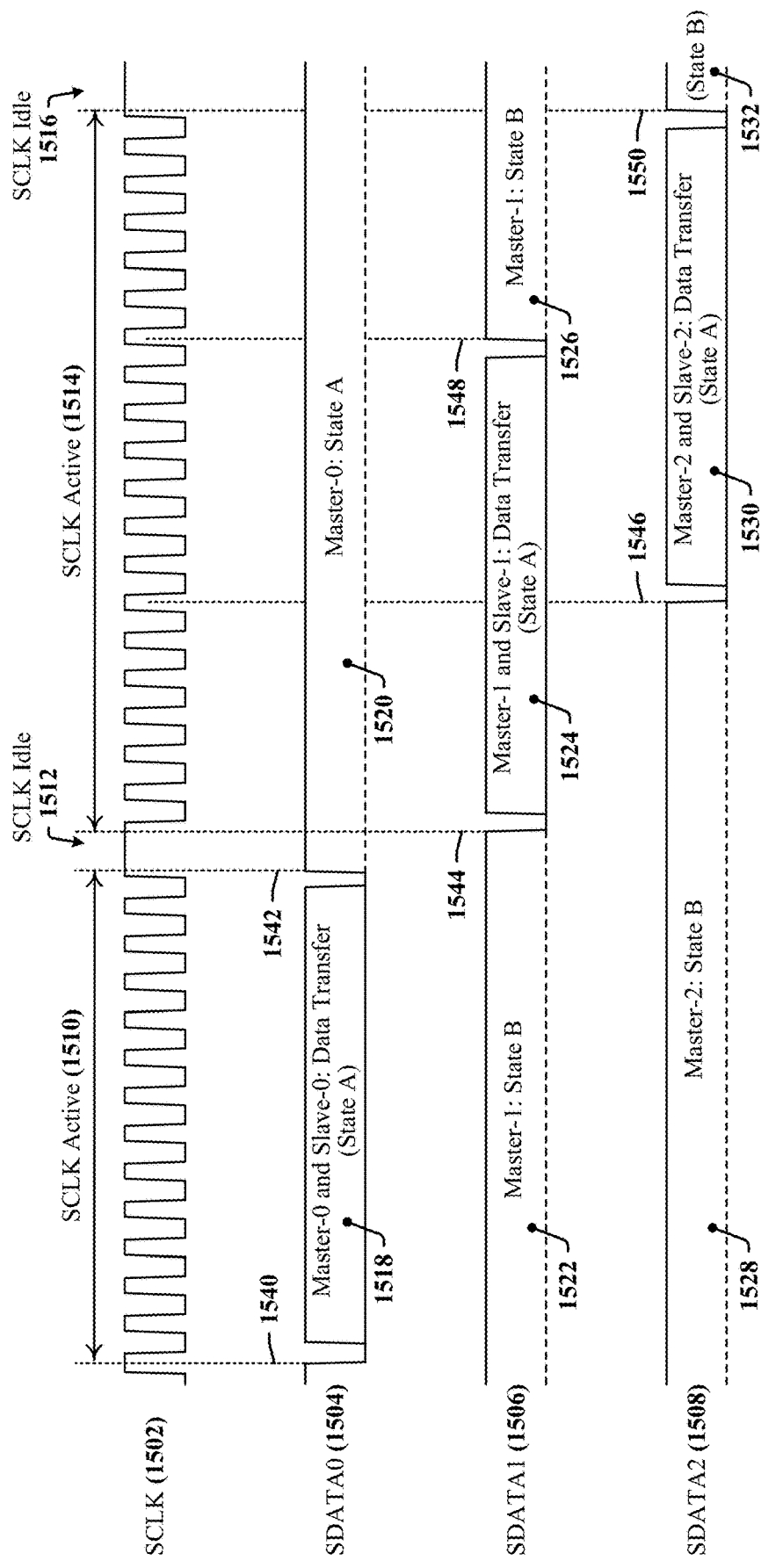
FIG. 15 illustrates signaling on multiple point-to-point data communication links configured in accordance with certain aspects of this disclosure.

FIG. 15 is a timing diagram 1500 that illustrates signaling on SCLK 1502 while overlapping transmissions are transmitted on point-to-point serial links. A first transaction is initiated at a first point in time 1540 when a START condition is transmitted on SDATA0 1504. SDATA0 1504 provides a first point-to-point serial link in combination with SCLK 1502. If not already active, SCLK 1502 becomes active 1510 as the start condition is indicated on SDATA0 and remains active for at least the duration of the data transfer 1518 associated with the first transaction. In the illustrated example, no other transaction is initiated before the completion of the first transaction and the second point in time 1542 at which a STOP condition is provided. SCLK 1502 enters an idle state 1512 and SDATA0 1504 is maintained in a high signaling state while the first point-to-point serial link is in an idle state 1520.

A second point-to-point serial link is initially in an idle state 1522 until, at a third point in time 1544, a START condition is transmitted on SDATA1 1506. SDATA1 1506 is included in the second point-to-point serial link together with SCLK 1502. SCLK 1502 leaves the idle state 1512 and enters the active state 1514 as the START condition is transmitted on SDATA1 1506. SCLK 1502 remains active for at least the duration of the data transfer 1524 associated with a second transaction conducted over the second point-to-point serial link. In the illustrated example, a third transaction is initiated at a fourth point in time 1546 before the completion of the second transaction. SDATA1 1506 may be maintained in a high signaling state 1526 after the STOP condition provided at a fifth point in time 1548. The latter STOP condition does not terminate the active state 1514 of SCLK 1502 while the third transaction is in progress. The active state 1514 of SCLK 1502 is extended to include the data transfer 1530 associated with the third transaction. SDATA1 1506 is maintained in a high signaling state after completion of the data transfer 1524 associated with the second transaction.

The third transaction is conducted over a third point-to-point serial link. The third point-to-point serial link is initially in an idle state 1528 until, at the fourth point in time 1546, a START condition is transmitted on SDATA2 1508. SDATA2 1508 is included in the third point-to-point serial link together with SCLK 1502. SCLK 1502 is already in the active state 1514 as the START condition is transmitted on SDATA2 1508. SCLK 1502 remains active for at least the duration of the data transfer 1530 associated with the third transaction. The active state 1514 of SCLK 1502 is extended to complete the data transfer 1530 associated with the third transaction. SDATA1 1506 is maintained in a high signaling state after completion of the data transfer 1524 associated with the second transaction. In the illustrated example, no other transaction is initiated before the completion of the third transaction and a STOP condition is provided at a sixth point in time 1550. SCLK 1502 enters an idle state 1516 and SDATA2 1508 is maintained in a high signaling state while the third point-to-point serial link is in an idle state 1532.

Figure 16:
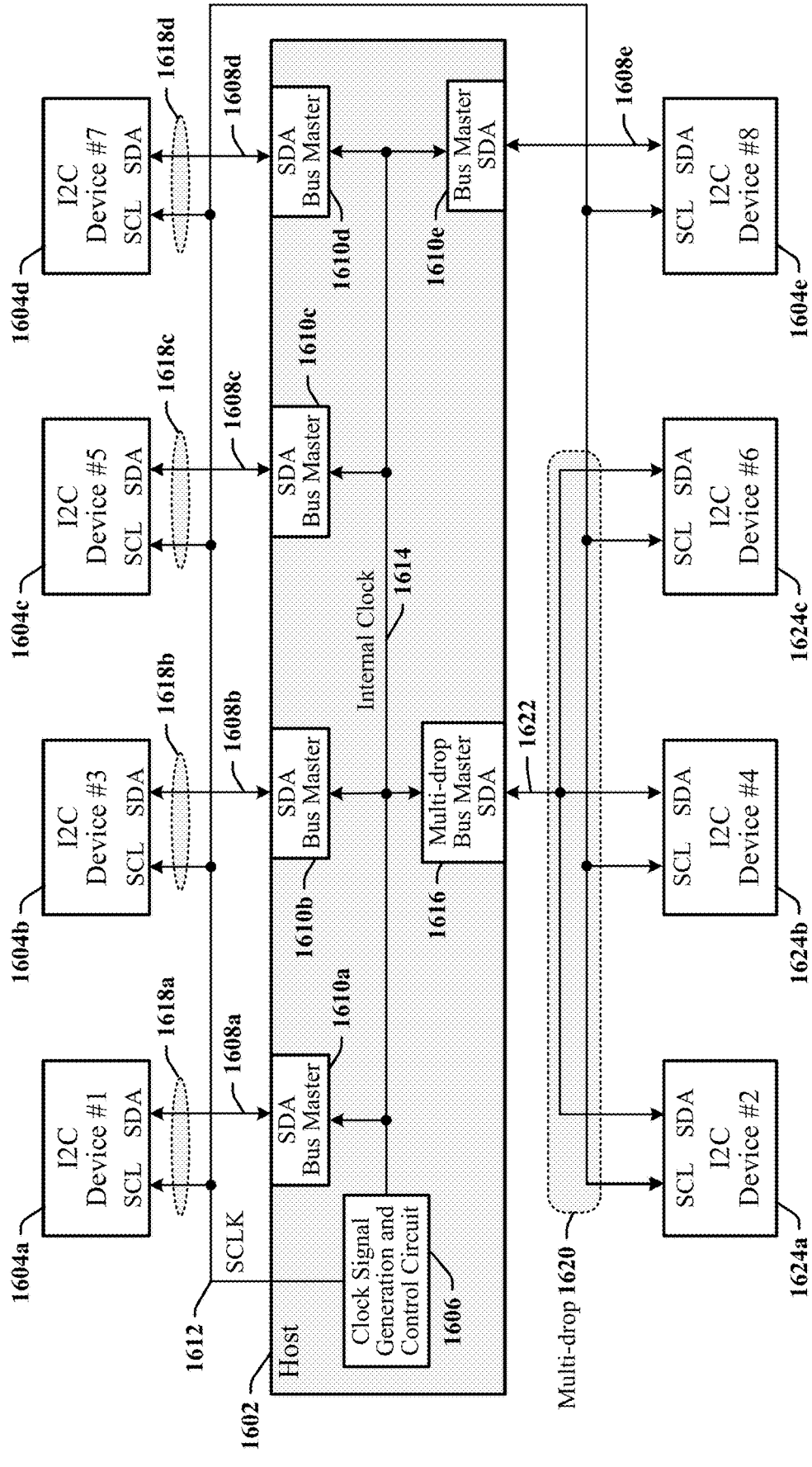
FIG. 16 illustrates a system that implements a combination point-to-point and multidrop serial links that share a clock signal in accordance with certain aspects of this disclosure.

A common clock signal provided in accordance with certain aspects of this disclosure may be used to control data transmissions over a combination of point-to-point and multidrop serial data links. FIG. 16 illustrates a system 1600 that includes multiple point-to-point serial links 1618a-1618e and a multidrop serial link 1620 that are configured to share the clock signal 1614 in accordance with certain aspects of this disclosure. In the illustrated example, a host device 1602 provides an internal clock signal 1614 that is used to control multiple bus master circuits 1610a-1610e, 1616. A clock signal representative of the internal clock signal 1614 may be transmitted over a shared or common SCLK 1612. The clock signal transmitted on SCLK 1612 is used to control timing of data transmissions over each SDA 1608a-1608e of the point-to-point serial links and over the SDA 1622 of the multidrop serial link 1620. The host device 1602 may include at least one application processor and a clock generation circuit 1606 that is coupled to SCLK 1612. The internal clock signal 1614 provided by the clock generation circuit 1606 is used by point-to-point bus master circuits 1610a-1610e and the multidrop bus master circuit 1616 to control timing of transmitters and receivers coupled to respective data lines (SDA 1608a-1608e and 1622). Some data lines (SDA 1608a-1608e) may be configured as point-to-point connections between the point-to-point bus master circuits 1610a-1610e and correspondent devices 1604a-1604e. In the illustrated example, one data line (SDA 1622) is configured as a multidrop link that couples the multidrop bus master circuit 1616 to one or more multidrop correspondent devices 1624a-1624c.

According to one aspect, the point-to-point serial links 1618a-1618e may be configurable to support multidrop communication and the multidrop serial link 1620 may be configurable to support point-to-point communication. In one example, the system 1600 may be deployed for use in an IC device in which one or more of the bus master circuits 1610a-1610e, 1616 are each coupled to a single slave device and one or more other bus master circuits 1610a-1610e, 1616 are each coupled to multiple slave devices. In this example, the host device 1602 may be configured during manufacture, assembly, system initialization and/or by application to define modes of operation for each of the bus master circuits 1610a-1610e, 1616. In some instances, each of the bus master circuits 1610a-1610e, 1616 may be configured to automatically detect and implement a suitable mode of operation. In some instances, a common configuration for the bus master circuits 1610a-1610e, 1616 inherently supports point-to-point and multidrop modes of operation using a shared or common SCLK 1612. In another example, the system 1600 may be deployed for use in an IC device in which one or more bus master circuits 1610a-1610e and/or 1616 is coupled to multiple slave devices that are capable or prone to entering an idle or sleep state, and the bus master circuits 1610a-1610e, 1616 may be configured for a mode of operation that seamlessly supports transitions between point-to-point and multidrop communication modes.

The clock generation circuit 1606 may be configured to provide a clock signal that is transmitted over SCLK 1612 when a transaction is initiated for any of the correspondent devices 1604a-1604e, 1624a-1624c. An active correspondent device 1604a-1604e or 1624a-1624c may use the clock signal transmitted over SCLK 1612 to control timing of a transmitter and receiver coupled to its SDA 1608a-1608e, 1622.

The clock generation circuit 1606 may supplant or augment the clock generation functions provided in conventional bus masters. In the illustrated example, each point-to-point bus master circuit 1610a-1610e and multidrop bus master circuit 1616 may be configured in accordance with certain aspects of this disclosure to manage communication between the host device 1602 and correspondent devices 1604a-1604e or 1624a-1624c. Each point-to-point bus master circuit 1610a-1610e may generate control signaling that is transmitted over a corresponding SDA 1608a-1608e in accordance with timing provided by the internal clock signal 1614 and the clock signal transmitted on SCLK 1612. Each multidrop bus master circuit 1616 may generate multidrop-compatible control signaling that is transmitted over its SDA 1622 in accordance with timing provided by the internal clock signal 1614 and the clock signal transmitted on SCLK 1612. Each point-to-point bus master circuit 1610a-1610e may request enablement of clock generation by the clock generation circuit 1606 during transactions with the respective correspondent device 1604a-1604e. Each multidrop bus master circuit 1616 may request enablement of clock generation by the clock generation circuit 1606 during transactions with multidrop correspondent devices 1624a-1624c.

In one example, a point-to-point bus master circuit 1610a-1610e or multidrop bus master circuit 1616 may cooperate with data management circuits to format and frame data to be transmitted to a correspondent device 1604a-1604e or 1624a-1624c over the respective SDA 1608a-1608e or 1622. In another example, a point-to-point bus master circuit 1610a-1610e or multidrop bus master circuit 1616 may cooperate with data management circuits to format and frame data to be received from a correspondent device 1604a-1604e or 1624a-1624c. In some instances, a point-to-point bus master circuit 1610a-1610e or multidrop bus master circuit 1616 may cooperate with data management circuits that can monitor transactions and other communication activity to determine when clock generation by the clock generation circuit 1606 is to be enabled.

Examples of Processing Circuits and Methods

Figure 17:
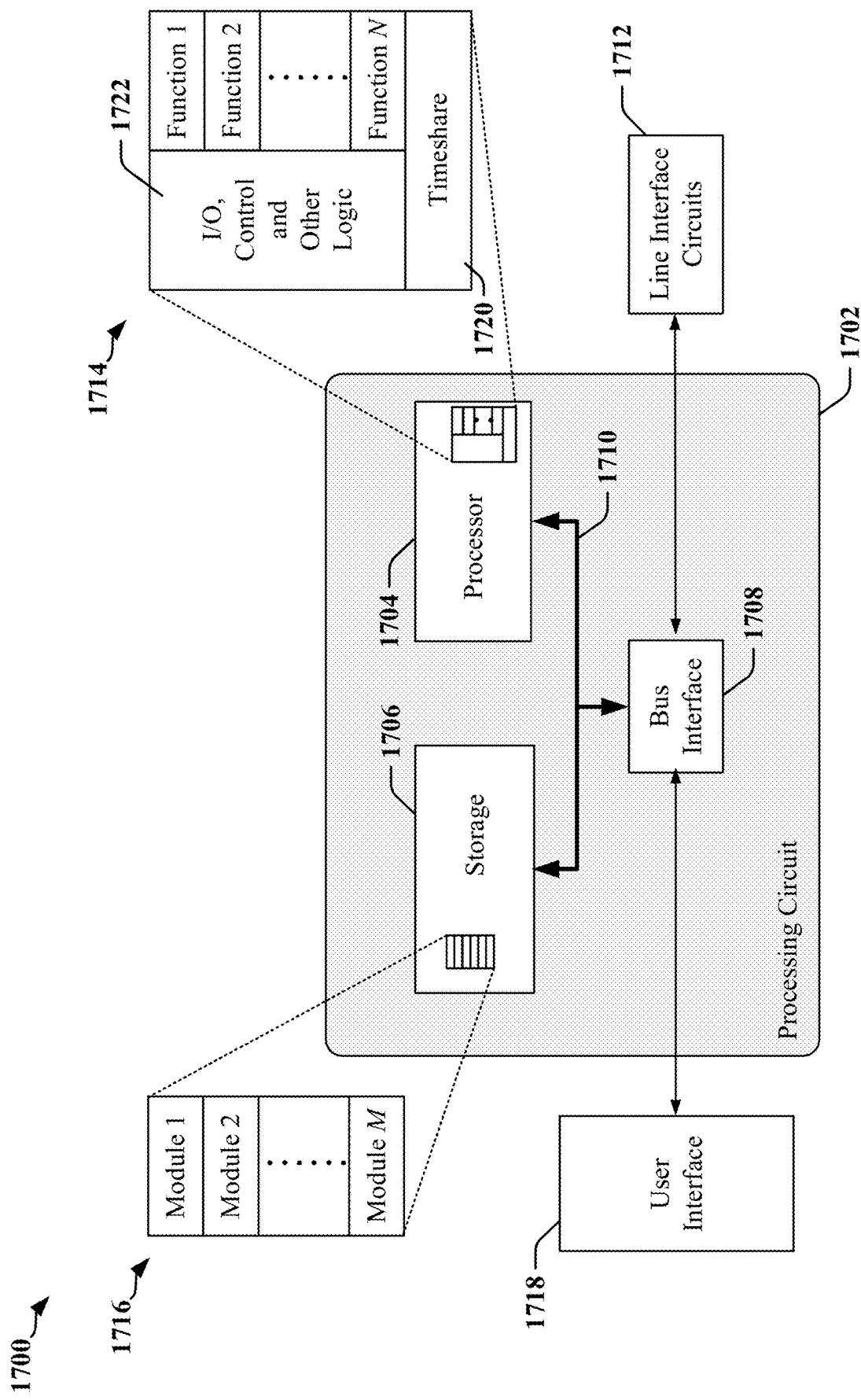
FIG. 17 is a block diagram illustrating an example of an apparatus employing a processing circuit that may be adapted according to certain aspects disclosed herein.

FIG. 17 is a diagram illustrating an example of a hardware implementation for an apparatus 1700 employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation. In various examples, the processing circuit 1702 may be implemented using a state machine, sequencer, signal processor and/or general-purpose processor, or a combination of such devices and circuits.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources and processing services provided by the processing circuit 1702. The resources may include memory, processing time, access to the transceiver 1712, the user interface 1718, and so on. The processing services may include commonly used functions including memory access functions, stack and memory management functions, scheduling services and communication functions and features such as data packetizers, data interleavers, data encryption algorithms, buffers and the like.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
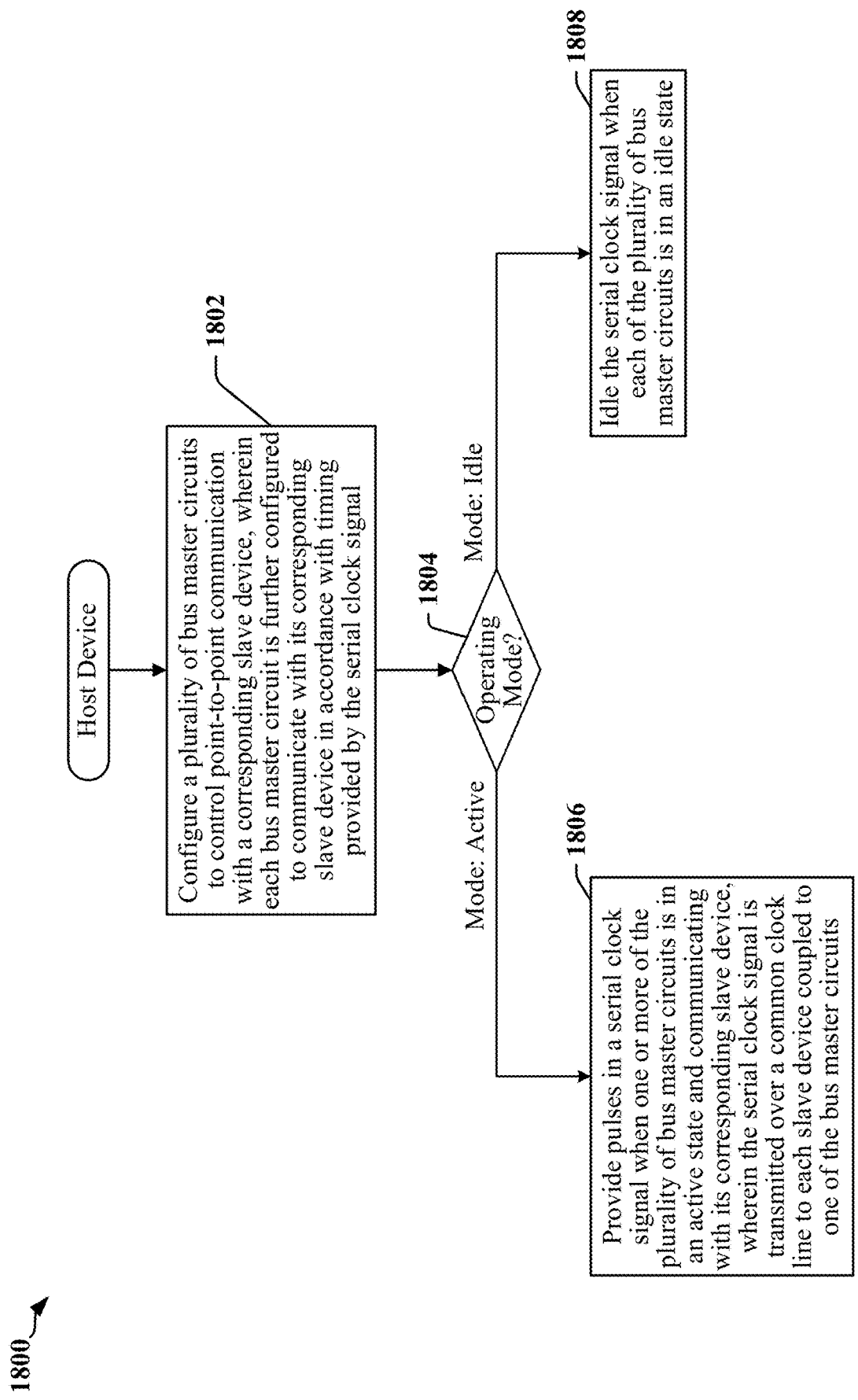
FIG. 18 is a flowchart illustrating certain aspects of point-to-point communication at a bus master device in accordance with certain aspects disclosed herein.

FIG. 18 is a flowchart 1800 illustrating method for data communication that may be performed at a host device that has been adapted in accordance with certain aspects of this disclosure. The host device may be configured to communicate with each of a plurality of peripheral devices through a point-to-point serial bus reserved for coupling the respective peripheral device to the host device. In one example, the peripheral devices include a serial bus interface configured for operation as a slave device in accordance with an I2C, I3C or other serial bus protocol.

At block 1802, the host device may configure a plurality of bus master circuits to control point-to-point communication with a corresponding slave device. At block 1804, the host device may determine a current operating mode for a serial bus clock signal based on the state of each bus master circuit. At block 1806, the host device may configure a clock generation circuit to provide pulses in the serial bus clock signal when the host device determines that the operating mode for the serial bus clock signal is an active mode at block 1804. The host device may determine that the operating mode for the serial bus clock signal is an active mode when one or more of the plurality of bus master circuits are in an active state and communicating with its corresponding slave device. At block 1808, the host device may configure a clock generation circuit to idle the serial bus clock signal when each of the plurality of bus master circuits is in an idle state. In one example, the serial bus clock signal may be idled by suppressing clock pulses on the serial bus clock signal or by refraining from generating such clock pulses. In some examples, serial bus protocols such as the I2C and I3C protocols provide that the serial bus clock signal be held in a high signaling state when the serial bus clock signal is idle. The serial bus clock signal may be transmitted over a common clock line to each slave device coupled to one of the plurality of bus master circuits. Each bus master circuit may be further configured to communicate with its corresponding slave device in accordance with the timing provided by the serial bus clock signal.

In some examples, each of a plurality of serial data I/O pads is configured to couple one of the plurality of bus master circuits to its corresponding slave device through a point-to-point data line. The host device may cause a first bus master circuit in the plurality of bus master circuits to maintain its corresponding serial data I/O pad in a high signaling state when the first bus master circuit is in the idle state and cause the first bus master circuit to initiate each transaction with its corresponding slave device by providing a start condition using signaling states of the serial data I/O pad and the common clock line. The host device may provide the start condition by driving the serial data I/O pad from the high signaling state to a low signaling state while the common clock line is in the high signaling state. The common clock line may be in the high signaling state when the serial bus clock signal is idle. The host device may provide the start condition by transmitting a pulse on the serial bus clock signal in implementations where the common clock line may be in the high signaling state while the pulse is on the serial bus clock signal, and then driving the data I/O pad from the high signaling state to the low signaling state at least a protocol-specified minimum time before a next negative transition in the serial bus clock signal.

In some examples, the host device may terminate each transaction with its corresponding slave device by providing a stop condition using signaling states of the serial data I/O pad and the common clock line. The host device may provide the stop condition by driving the serial data I/O pad from the low signaling state to the high signaling state while the common clock line is in a high signaling state.

In some examples, the host device may route a first data stream between a first application and a first slave device using a first bus master circuit in the plurality of bus master circuits hat is configured to control communication with the first slave device, route a second data stream between a second application and a second slave device using a second bus master circuit that is configured to control communication with the second slave device, and enforce data stream security by maintain separation between the first data stream and the second data stream. The separation between the first data stream and the second data stream may be maintained by providing separate processing services, memory or registers to route data for the respective applications and slave devices.

In some examples, the host device may configure at least one multidrop bus master circuit to control communication with a plurality of multidrop slave devices over a common data line in accordance with the timing provided by the serial bus clock signal.

In some examples, the host device may configure at least one of the plurality of bus master circuits to communicate with its corresponding slave device in accordance with an I2C protocol. The host device may configure at least one of the plurality of bus master circuits to communicate with its corresponding slave device in accordance with an I3C protocol.

Figure 19:
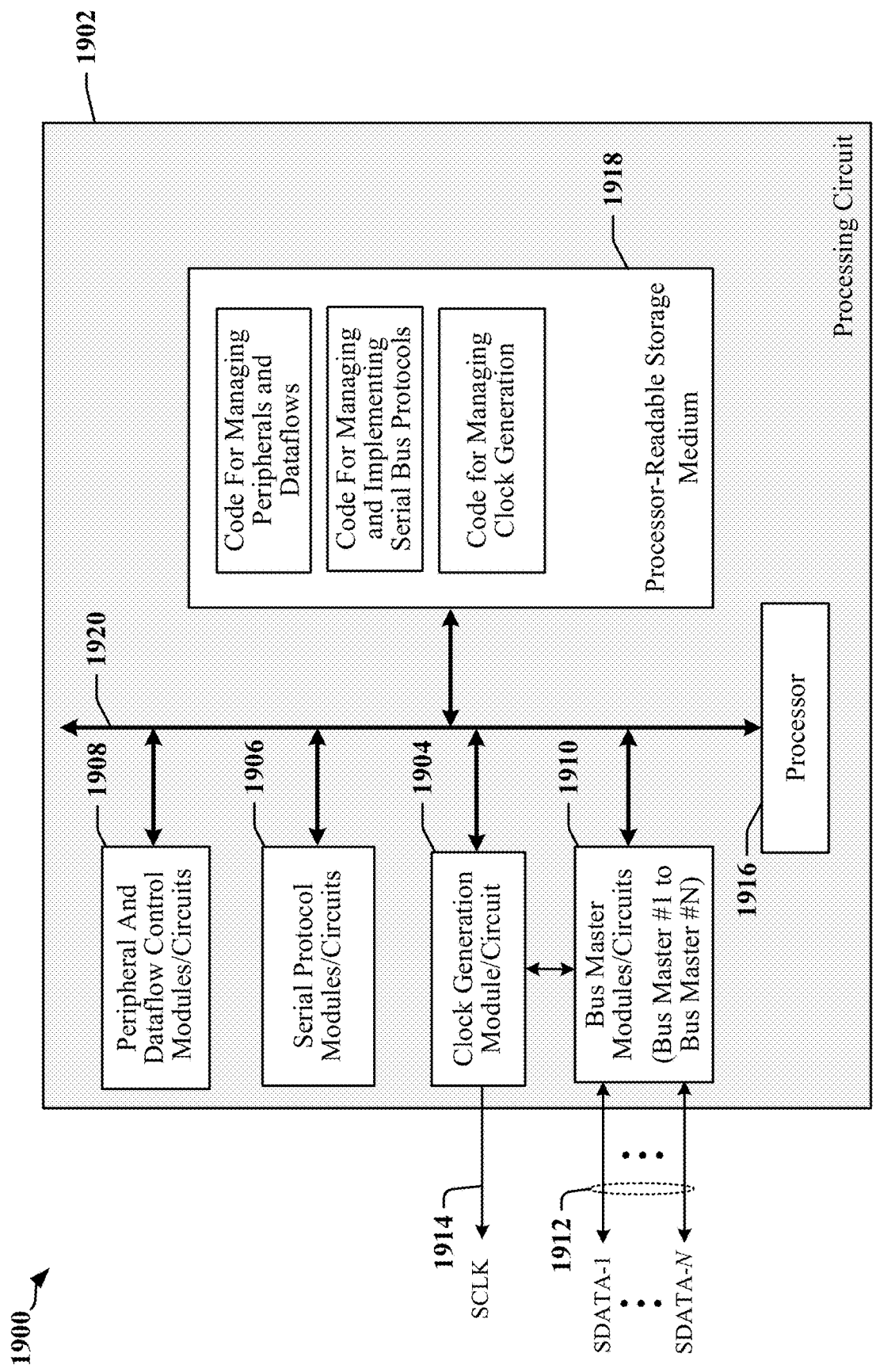
FIG. 19 illustrates a processing circuit adapted in accordance with certain aspects of this disclosure.

FIG. 19 illustrates an example of a hardware implementation for an apparatus 1900 employing a processing circuit 1902. In one example, the apparatus 1900 is configured for operation as a host device that can support multiple point-to-point serial connections. The point-to-point serial connections may be operated in accordance with an I2C, I3C or other multidrop serial bus protocol. In some examples, the processing circuit 1902 may be included in the systems 1000, 1100, 1200 and/or 1600 illustrated in FIGS. 10-12 and 16.

In some examples, the processing circuit 1902 has a controller or processor 1916 that includes one or more microprocessors, microcontrollers, digital signal processors, sequencers and/or state machines represented by the controller or processor 1916. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including the processor 1916, the modules or circuits 1904, 1906, 1908 and 1910 and the processor-readable storage medium 1918. The bus 1920 may also link various other circuits such as timing sources, peripherals, voltage regulators, and power management circuits, which are well known in the art, and therefore, will not be described any further.

The apparatus 1900 may be coupled to multiple (N) data lines 1912 that are used to implement multiple point-to-point serial links that each includes a serial bus clock line 1914. That is, each point-to-point serial link is includes the serial bus clock line 1914 and one of the data lines 1912. The processing circuit 1902 includes or is coupled to multiple (N) bus master circuits 1910, each of which controls operations over one of the point-to-point serial links. The bus master circuits 1910 may be configured to operate its corresponding point-to-point serial link in accordance with a multidrop serial bus protocol such as an I2C or I3C protocol. The processing circuit 1902 may include a clock generation circuit 1904 that is configurable to provide a clock signal used by all of the bus master circuits 1910 to control timing of transmissions over its corresponding point-to-point serial link.

The processor 1916 is responsible for general processing, including the execution of software, code and/or instructions stored on the processor-readable storage medium 1918. The computer-readable storage medium may include a non-transitory storage medium. The software, when executed by the processor 1916, causes the processing circuit 1902 to perform the various functions described supra for any particular apparatus. The computer-readable storage medium may be used for storing data that is manipulated by the processor 1916 when executing software. The processing circuit 1902 further includes at least one of the modules 1904, 1906 and 1908. The modules 1904, 1906 and 1908 may be software modules running in the processor 1916, resident/stored in the processor-readable storage medium 1918, one or more hardware modules coupled to the processor 1916, or some combination thereof. The modules 1904, 1906 and 1908 may include microcontroller instructions, state machine configuration parameters, or some combination thereof. The processing circuit 1902 may include other modules or circuits that provide various processing services, including services provided by timing functions, mathematical functions, encryption functions, memory management functions, among other functions.

In one configuration, the bus master circuits 1910 include or are coupled to interface and driver circuits, including transceivers and line driver circuits each coupled to the serial bus clock line 1914 or one of the data lines 1912. The processing circuit 1902 may include modules or circuits 1906 that manage, configure the bus master circuits 1910 to implement one or more serial bus protocols. The processing circuit 1902 may include modules or circuits 1908 that manage dataflows between applications and peripheral devices coupled to the apparatus through the bus master circuits 1910. In some examples, the modules or circuits 1908 that manage dataflows may implement or support the functions of the data control circuit 1214 illustrated in FIG. 12. In some instances, the modules or circuits 1908 that manage dataflows may enable the processing circuit 1902 to operate as a router that can direct a data stream received from each of a plurality of sources to a destination for the data stream.

In one example, the apparatus 1900 includes a processor 1916 and a plurality of bus master circuits 1910, each bus master circuit 1910 being configured to control point-to-point communication with a corresponding slave device. The apparatus 1900 may include a clock generation circuit 1904 configured to provide pulses in a serial bus clock signal when one or more of the plurality of bus master circuits are in an active state and communicating with its corresponding slave device. The clock generation circuit 1904 may be further configured to idle the serial bus clock signal when each of the plurality of bus master circuits is in an idle state. The serial bus clock signal may be transmitted over a common clock line 1914 to each slave device coupled to one of the plurality of bus master circuits 1910. Each bus master circuit 1910 may be further configured to communicate with its corresponding slave device in accordance with the timing provided by the serial bus clock signal.

In some examples, the apparatus 1900 includes a plurality of serial data I/O pads. Each serial data I/O pad may be configured to couple one of the plurality of bus master circuits 1910 to its corresponding slave device through a point-to-point data line. A first bus master circuit in the plurality of bus master circuits may be further configured to maintain its corresponding serial data I/O pad in a high signaling state when the first bus master circuit is in the idle state, and initiate each transaction with its corresponding slave device by providing a start condition using signaling states of the serial data I/O pad and the common clock line 1914. The start condition may be provided when the serial data I/O pad is driven from the high signaling state to the low signaling state while the common clock line 1914 is in the high signaling state. The common clock line 1914 may be in the high signaling state when the serial bus clock signal is idle. The common clock line 1914 may be in the high signaling state when a pulse is provided in the serial bus clock signal. The first bus master circuit may be further configured to drive the data I/O pad from the high signaling state to the low signaling state at least a protocol-specified minimum time before a next negative transition in the serial bus clock signal.

In some examples, the first bus master circuit is further configured to terminate each transaction with its corresponding slave device by providing a stop condition using signaling states of the serial data I/O pad and the common clock line 1914. The stop condition may be provided when the serial data I/O pad is driven from a low signaling state to the high signaling state while the common clock line 1914 is in a high signaling state.

In some examples, the apparatus 1900 includes a data control circuit configured to route a first data stream between a first application and a first slave device using a first bus master circuit in the plurality of bus master circuits hat is configured to control communication with the first slave device, route a second data stream between a second application and a second slave device using a second bus master circuit that is configured to control communication with the second slave device, and enforce data stream security by maintain separation between the first data stream and the second data stream. The separation between the first data stream and the second data stream may be maintained by providing separate processing services, memory or registers to route data for the respective applications and slave devices.

In some examples, the apparatus 1900 includes at least one multidrop bus master circuit configured to control communication with a plurality of multidrop slave devices over a common data line in accordance with the timing provided by the serial bus clock signal.

In one example, at least one of the plurality of bus master circuits 1910 is further configured to communicate with its corresponding slave device in accordance with an I2C protocol or an I3C protocol.

In some examples, the processor-readable storage medium 1918 may store, maintain or otherwise include code which, when executed by the processor 1916, causes the processor 1916 to configure a plurality of bus master circuits 1910 to control point-to-point communication with a corresponding slave device, and configure a clock generation circuit to provide pulses in a serial bus clock signal when one or more of the plurality of bus master circuits 1910 are in an active state and communicating with its corresponding slave device and idle the serial bus clock signal when each of the plurality of bus master circuits 1910 is in an idle state. The serial bus clock signal may be transmitted over a common clock line 1914 to each slave device coupled to one of the plurality of bus master circuits 1910. Each bus master circuit 1910 may be further configured to communicate with its corresponding slave device in accordance with the timing provided by the serial bus clock signal.

In some examples, each of a plurality of serial data I/O pads is configured to couple one of the plurality of bus master circuits 1910 to its corresponding slave device through a point-to-point data line. The code may cause the processor 1916 to cause a first bus master circuit in the plurality of bus master circuits to maintain its corresponding serial data I/O pad in a high signaling state when the first bus master circuit is in the idle state and cause the first bus master circuit to initiate each transaction with its corresponding slave device by driving the serial data I/O pad from the high signaling state to the low signaling state while the common clock line 1914 is in the high signaling state. The common clock line 1914 is in the high signaling state when the serial bus clock signal is idle or when a pulse is provided on the serial bus clock signal.

In some examples, the code further causes the processor 1916 to terminate each transaction with its corresponding slave device by driving the serial data I/O pad from the low signaling state to the high signaling state while the common clock line 1914 is in a high signaling state. The code may cause the processor 1916 to route a first data stream between a first application and a first slave device using a first bus master circuit in the plurality of bus master circuits hat is configured to control communication with the first slave device, route a second data stream between a second application and a second slave device using a second bus master circuit that is configured to control communication with the second slave device, and enforce data stream security by maintain separation between the first data stream and the second data stream by providing separate processing services, memory or registers to route data for the respective applications and slave devices.

In certain examples, the code further causes the processor 1916 to configure at least one multidrop bus master circuit to control communication with a plurality of multidrop slave devices over a common data line in accordance with the timing provided by the serial bus clock signal.

In one example, at least one of the plurality of bus master circuits 1910 is further configured to communicate with its corresponding slave device in accordance with an I2C protocol or an I3C protocol.

Some implementation examples are described in the following numbered clauses:
  1. An apparatus for data communication, comprising: a plurality of bus master circuits, each bus master circuit being configured to control point-to-point communication with a corresponding slave device; and a clock generation circuit configured to provide pulses in a serial bus clock signal when one or more of the plurality of bus master circuits are in an active state and communicating with its corresponding slave device, and further configured to idle the serial bus clock signal when each of the plurality of bus master circuits is in an idle state, wherein the serial bus clock signal is transmitted over a common clock line to each slave device coupled to one of the plurality of bus master circuits, and wherein each bus master circuit is further configured to communicate with its corresponding slave device in accordance with the timing provided by the serial bus clock signal.

2. The apparatus as described in clause 1, further comprising: a plurality of serial data input/output pads, each serial data input/output pad configured to couple one of the plurality of bus master circuits to its corresponding slave device through a point-to-point data line.

3. The apparatus as described in clause 2, wherein a first bus master circuit in the plurality of bus master circuits is further configured to: maintain its corresponding serial data input/output pad in a high signaling state when the first bus master circuit is in the idle state; and initiate each transaction with its corresponding slave device by providing a start condition using signaling states of the serial data input/output pad and the common clock line.

4. The apparatus as described in clause 3, wherein the start condition is provided when the serial data input/output pad is driven from the high signaling state to a low signaling state while the common clock line is in the high signaling state.

5. The apparatus as described in clause 4, wherein a pulse provided in the serial bus clock signal causes the common clock line to transition to the high signaling state, and wherein the first bus master circuit is further configured to initiate the each transaction by driving the serial data input/output pad from the high signaling state to the low signaling state at least a protocol-specified minimum time before a next negative transition in the serial bus clock signal.

6. The apparatus as described in any of clauses 2-5, wherein a first bus master circuit in the plurality of bus master circuits is further configured to: terminate each transaction with its corresponding slave device by providing a stop condition using signaling states of the serial data input/output pad and the common clock line.

7. The apparatus as described in clause 6, wherein the stop condition is provided when the serial data input/output pad is driven from a low signaling state to a high signaling state while the common clock line is in the high signaling state.

8. The apparatus as described in any of clauses 1-7, wherein the common clock line is in a high signaling state when the serial bus clock signal is idle.

9. The apparatus as described in any of clauses 1-8, further comprising a data control circuit configured to: route a first data stream between a first application and a first slave device using a first bus master circuit in the plurality of bus master circuits hat is configured to control communication with the first slave device; route a second data stream between a second application and a second slave device using a second bus master circuit that is configured to control communication with the second slave device; and enforce data stream security by maintain separation between the first data stream and the second data stream.

10. The apparatus as described in clause 9, wherein the separation between the first data stream and the second data stream is maintained by providing separate processing services, memory or registers to route data for the respective applications and slave devices.

11. The apparatus as described in any of clauses 1-10, further comprising: at least one multidrop bus master circuit configured to control communication with a plurality of multidrop slave devices over a common data line in accordance with the timing provided by the serial bus clock signal.

12. The apparatus as described in any of clauses 1-11, wherein at least one of the plurality of bus master circuits is further configured to communicate with its corresponding slave device in accordance with an Inter-Integrated Circuit (I2C) or an Improved Inter-Integrated Circuit (I3C) protocol.

13. A method for data communication, comprising: configuring a plurality of bus master circuits to control point-to-point communication with a corresponding slave device; and configuring a clock generation circuit to: provide pulses in a serial bus clock signal when one or more of the plurality of bus master circuits are in an active state and communicating with its corresponding slave device; and idle the serial bus clock signal when each of the plurality of bus master circuits is in an idle state, wherein the serial bus clock signal is transmitted over a common clock line to each slave device coupled to one of the plurality of bus master circuits, and wherein each bus master circuit is further configured to communicate with its corresponding slave device in accordance with the timing provided by the serial bus clock signal.

14. The method as described in clause 13, wherein each of a plurality of serial data input/output pads is configured to couple one of the plurality of bus master circuits to its corresponding slave device through a point-to-point data line.

15. The method as described in clause 14, further comprising: causing a first bus master circuit in the plurality of bus master circuits to maintain its corresponding serial data input/output pad in a high signaling state when the first bus master circuit is in the idle state; and causing the first bus master circuit to initiate each transaction with its corresponding slave device by providing a start condition using signaling states of the serial data input/output pad and the common clock line.

16. The method as described in clause 15, wherein providing the start condition comprises: driving the serial data input/output pad from the high signaling state to a low signaling state while the common clock line is in the high signaling state.

17. The method as described in clause 16, wherein providing the start condition comprises: providing a pulse on the serial bus clock signal, wherein the common clock line is in the high signaling state while the pulse is on the serial bus clock signal; and driving the serial data input/output pad from the high signaling state to the low signaling state at least a protocol-specified minimum time before a next negative transition in the serial bus clock signal.

18. The method as described in any of clauses 14-17, further comprising: terminating each transaction with its corresponding slave device by providing a stop condition using signaling states of the serial data input/output pad and the common clock line.

19. The method as described in clause 18, wherein providing the stop condition comprises: driving the serial data input/output pad from a low signaling state to a high signaling state while the common clock line is in the high signaling state.

20. The method as described in any of clauses 13-19, wherein the common clock line is in a high signaling state when the serial bus clock signal is idle.
21. The method as described in any of clauses 13-20, further comprising causing a data control circuit to: route a first data stream between a first application and a first slave device using a first bus master circuit in the plurality of bus master circuits hat is configured to control communication with the first slave device; route a second data stream between a second application and a second slave device using a second bus master circuit that is configured to control communication with the second slave device; and enforce data stream security by maintain separation between the first data stream and the second data stream.
22. The method as described in clause 21, wherein the separation between the first data stream and the second data stream is maintained by providing separate processing services, memory or registers to route data for the respective applications and slave devices.
23. The method as described in any of clauses 13-22, further comprising: configuring at least one multidrop bus master circuit to control communication with a plurality of multidrop slave devices over a common data line in accordance with the timing provided by the serial bus clock signal.
24. The method as described in any of clauses 13-23, further comprising: configuring at least one of the plurality of bus master circuits to communicate with its corresponding slave device in accordance with an Inter-Integrated Circuit (I2C) or an Improved Inter-Integrated Circuit (I3C) protocol.
25. A computer-readable medium storing computer executable code, the code when executed by a processor cause the processor to: configure a plurality of bus master circuits to control point-to-point communication with a corresponding slave device; and configure a clock generation circuit to: provide pulses in a serial bus clock signal when one or more of the plurality of bus master circuits are in an active state and communicating with its corresponding slave device; and idle the serial bus clock signal when each of the plurality of bus master circuits is in an idle state, wherein the serial bus clock signal is transmitted over a common clock line to each slave device coupled to one of the plurality of bus master circuits, and wherein each bus master circuit is further configured to communicate with its corresponding slave device in accordance with the timing provided by the serial bus clock signal.
26. The computer-readable medium as described in clause 25, wherein each of a plurality of serial data input/output pads is configured to couple one of the plurality of bus master circuits to its corresponding slave device through a point-to-point data line.
27. The computer-readable medium as described in clause 26, wherein the code further causes the processor to: cause a first bus master circuit in the plurality of bus master circuits to maintain its corresponding serial data input/output pad in a high signaling state when the first bus master circuit is in the idle state; and cause the first bus master circuit to initiate each transaction with its corresponding slave device by driving the serial data input/output pad from the high signaling state to a low signaling state while the common clock line is in the high signaling state, wherein the common clock line is in the high signaling state when the serial bus clock signal is idle or when a pulse is provided on the serial bus clock signal.
28. The computer-readable medium as described in clause 26 or clause 27, wherein the code further causes the processor to: terminate each transaction with its corresponding slave device by driving the serial data input/output pad from a low signaling state to a high signaling state while the common clock line is in the high signaling state.
29. The computer-readable medium as described in any of clauses 25-28, wherein the code further causes the processor to: route a first data stream between a first application and a first slave device using a first bus master circuit in the plurality of bus master circuits hat is configured to control communication with the first slave device; route a second data stream between a second application and a second slave device using a second bus master circuit that is configured to control communication with the second slave device; and enforce data stream security by maintain separation between the first data stream and the second data stream by providing separate processing services, memory or registers to route data for the respective applications and slave devices.
30. The computer-readable medium as described in any of clauses 25-29, wherein the code further causes the processor to: configure at least one multidrop bus master circuit to control communication with a plurality of multidrop slave devices over a common data line in accordance with the timing provided by the serial bus clock signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. An apparatus for data communication, comprising:
a plurality of bus master circuits, each bus master circuit being configured to control point-to-point communication with a corresponding slave device; and a clock generation circuit configured to provide pulses in a serial bus clock signal when one or more of the plurality of bus master circuits are in an active state and communicating with its corresponding slave device, and further configured to idle the serial bus clock signal when each of the plurality of bus master circuits is in an idle state, wherein the serial bus clock signal is transmitted over a common clock line to each slave device coupled to one of the plurality of bus master circuits, and wherein each bus master circuit is further configured to communicate with its corresponding slave device in accordance with timing provided by the serial bus clock signal.

2. The apparatus of claim 1, further comprising:
a plurality of serial data input/output pads, each serial data input/output pad configured to couple one of the plurality of bus master circuits to its corresponding slave device through a point-to-point data line.

3. The apparatus of claim 2, wherein a first bus master circuit in the plurality of bus master circuits is further configured to:
maintain its corresponding serial data input/output pad in a high signaling state when the first bus master circuit is in the idle state; and
initiate each transaction with its corresponding slave device by providing a start condition using signaling states of the serial data input/output pad and the common clock line.

4. The apparatus of claim 3, wherein the start condition is provided when the serial data input/output pad is driven from the high signaling state to a low signaling state while the common clock line is in the high signaling state.

5. The apparatus of claim 4, wherein a pulse provided in the serial bus clock signal causes the common clock line to transition to the high signaling state, and wherein the first bus master circuit is further configured to initiate the each transaction by driving the serial data input/output pad from the high signaling state to the low signaling state at least a protocol-specified minimum time before a next negative transition in the serial bus clock signal.

6. The apparatus of claim 2, wherein a first bus master circuit in the plurality of bus master circuits is further configured to:
terminate each transaction with its corresponding slave device by providing a stop condition using signaling states of the serial data input/output pad and the common clock line.

7. The apparatus of claim 6, wherein the stop condition is provided when the serial data input/output pad is driven from a low signaling state to a high signaling state while the common clock line is in the high signaling state.

8. The apparatus of claim 1, wherein the common clock line is in a high signaling state when the serial bus clock signal is idle.

9. The apparatus of claim 1, further comprising a data control circuit configured to:
route a first data stream between a first application and a first slave device using a first bus master circuit in the plurality of bus master circuits that is configured to control communication with the first slave device;
route a second data stream between a second application and a second slave device using a second bus master circuit that is configured to control communication with the second slave device; and enforce data stream security by maintain separation between the first data stream and the second data stream.

10. The apparatus of claim 9, wherein the separation between the first data stream and the second data stream is maintained by providing separate processing services, memory or registers to route data for the respective applications and slave devices.

11. The apparatus of claim 1, further comprising:
at least one multidrop bus master circuit configured to control communication with a plurality of multidrop slave devices over a common data line in accordance with the timing provided by the serial bus clock signal.

12. The apparatus of claim 1, wherein at least one of the plurality of bus master circuits is further configured to communicate with its corresponding slave device in accordance with an Inter-Integrated Circuit (I2C) or an Improved Inter-Integrated Circuit (I3C) protocol.

13. A method for data communication, comprising:
configuring a plurality of bus master circuits to control point-to-point communication with a corresponding slave device; and
configuring a clock generation circuit to:
provide pulses in a serial bus clock signal when one or more of the plurality of bus master circuits are in an active state and communicating with its corresponding slave device; and
idle the serial bus clock signal when each of the plurality of bus master circuits is in an idle state,
wherein the serial bus clock signal is transmitted over a common clock line to each slave device coupled to one of the plurality of bus master circuits, and
wherein each bus master circuit is further configured to communicate with its corresponding slave device in accordance with timing provided by the serial bus clock signal.

14. The method of claim 13, wherein each of a plurality of serial data input/output pads is configured to couple one of the plurality of bus master circuits to its corresponding slave device through a point-to-point data line.

15. The method of claim 14, further comprising:
causing a first bus master circuit in the plurality of bus master circuits to maintain its corresponding serial data input/output pad in a high signaling state when the first bus master circuit is in the idle state; and
causing the first bus master circuit to initiate each transaction with its corresponding slave device by providing a start condition using signaling states of the serial data input/output pad and the common clock line.

16. The method of claim 15, wherein providing the start condition comprises:
driving the serial data input/output pad from the high signaling state to a low signaling state while the common clock line is in the high signaling state.

17. The method of claim 16, wherein providing the start condition comprises:
providing a pulse on the serial bus clock signal, wherein the common clock line is in the high signaling state while the pulse is on the serial bus clock signal; and
driving the serial data input/output pad from the high signaling state to the low signaling state at least a protocol-specified minimum time before a next negative transition in the serial bus clock signal.

18. The method of claim 14, further comprising:
terminating each transaction with its corresponding slave device by providing a stop condition using signaling states of the serial data input/output pad and the common clock line.

19. The method of claim 18, wherein providing the stop condition comprises:
driving the serial data input/output pad from a low signaling state to a high signaling state while the common clock line is in the high signaling state.

20. The method of claim 13, wherein the common clock line is in a high signaling state when the serial bus clock signal is idle.

21. The method of claim 13, further comprising causing a data control circuit to:
route a first data stream between a first application and a first slave device using a first bus master circuit in the plurality of bus master circuits that is configured to control communication with the first slave device;
route a second data stream between a second application and a second slave device using a second bus master circuit that is configured to control communication with the second slave device; and
enforce data stream security by maintain separation between the first data stream and the second data stream.

22. The method of claim 21, wherein the separation between the first data stream and the second data stream is maintained by providing separate processing services, memory or registers to route data for the respective applications and slave devices.

23. The method of claim 13, further comprising:
configuring at least one multidrop bus master circuit to control communication with a plurality of multidrop slave devices over a common data line in accordance with the timing provided by the serial bus clock signal.

24. The method of claim 13, further comprising:
configuring at least one of the plurality of bus master circuits to communicate with its corresponding slave device in accordance with an Inter-Integrated Circuit (I2C) or an Improved Inter-Integrated Circuit (I3C) protocol.

25. A non-transitory computer-readable medium storing computer executable code, the code when executed by a processor cause the processor to:
configure a plurality of bus master circuits to control point-to-point communication with a corresponding slave device; and
configure a clock generation circuit to:
provide pulses in a serial bus clock signal when one or more of the plurality of bus master circuits are in an active state and communicating with its corresponding slave device; and
idle the serial bus clock signal when each of the plurality of bus master circuits is in an idle state,
wherein the serial bus clock signal is transmitted over a common clock line to each slave device coupled to one of the plurality of bus master circuits, and
wherein each bus master circuit is further configured to communicate with its corresponding slave device in accordance with timing provided by the serial bus clock signal.

26. The non-transitory computer-readable medium of claim 25, wherein each of a plurality of serial data input/output pads is configured to couple one of the plurality of bus master circuits to its corresponding slave device through a point-to-point data line.

27. The non-transitory computer-readable medium of claim 26, wherein the code further causes the processor to:
cause a first bus master circuit in the plurality of bus master circuits to maintain its corresponding serial data input/output pad in a high signaling state when the first bus master circuit is in the idle state; and
cause the first bus master circuit to initiate each transaction with its corresponding slave device by driving the serial data input/output pad from the high signaling state to a low signaling state while the common clock line is in the high signaling state,
wherein the common clock line is in the high signaling state when the serial bus clock signal is idle or when a pulse is provided on the serial bus clock signal.

28. The non-transitory computer-readable medium of claim 26, wherein the code further causes the processor to:
terminate each transaction with its corresponding slave device by driving the serial data input/output pad from a low signaling state to a high signaling state while the common clock line is in the high signaling state.

29. The non-transitory computer-readable medium of claim 25, wherein the code further causes the processor to:
route a first data stream between a first application and a first slave device using a first bus master circuit in the plurality of bus master circuits that is configured to control communication with the first slave device;
route a second data stream between a second application and a second slave device using a second bus master circuit that is configured to control communication with the second slave device; and
enforce data stream security by maintain separation between the first data stream and the second data stream by providing separate processing services, memory or registers to route data for the respective applications and slave devices.

30. The non-transitory computer-readable medium of claim 25, wherein the code further causes the processor to:
configure at least one multidrop bus master circuit to control communication with a plurality of multidrop slave devices over a common data line in accordance with the timing provided by the serial bus clock signal.

* * * * *